United States Patent
Guarnieri et al.

(10) Patent No.: US 12,197,904 B2
(45) Date of Patent: Jan. 14, 2025

(54) COLLABORATIVE WORK ON TRANSLATIONS IN INDUSTRIAL SYSTEM PROJECTS

(71) Applicant: Rockwell Automation Technologies, Inc., Mayfield Heights, OH (US)

(72) Inventors: Valerio Guarnieri, Mantova (IT); Alessandro Menon, Verona (IT)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 127 days.

(21) Appl. No.: 17/934,683

(22) Filed: Sep. 23, 2022

(65) Prior Publication Data

US 2024/0103826 A1 Mar. 28, 2024

(51) Int. Cl.
G06F 9/44 (2018.01)
G06F 8/65 (2018.01)

(52) U.S. Cl.
CPC .................... *G06F 8/65* (2013.01)

(58) Field of Classification Search
None
See application file for complete search history.

(56) References Cited

U.S. PATENT DOCUMENTS

| | | |
|---|---|---|
| 5,301,336 A | 4/1994 | Kodosky et al. |
| 7,080,088 B1 | 7/2006 | Lau |
| 7,343,585 B1 | 3/2008 | Lau et al. |
| 7,571,092 B1 * | 8/2009 | Nieh .............. G06F 9/454 704/277 |
| 7,636,656 B1 * | 12/2009 | Nieh .............. G06F 40/58 704/277 |
| 7,703,027 B2 | 4/2010 | Hsu et al. |
| 8,151,244 B2 * | 4/2012 | Hsu ................ G06F 8/34 717/113 |
| 8,825,692 B1 * | 9/2014 | Telnov ............ G06F 9/454 707/760 |
| 9,235,395 B2 | 1/2016 | Kodosky et al. |

(Continued)

FOREIGN PATENT DOCUMENTS

EP 2 487 582 A1 8/2012

OTHER PUBLICATIONS

Non-Final Office Action received for U.S. Appl. No. 17/554,488, dated Apr. 27, 2023, 37 pages.

(Continued)

*Primary Examiner* — Insun Kang
(74) *Attorney, Agent, or Firm* — Amin, Turocy & Watson, LLP

(57) ABSTRACT

An industrial integrated development environment (IDE) supports collaborative editing of translation tables used to facilitate rendering of the system project text in different defined languages. Rather than merging edits by comparing text representations of the edited translation tables on a line-by-line basis, the system expresses the edited and base versions of the translation tables as information models that represent the translation table versions as hierarchical organizations of nodes representing content of the tables, and compares corresponding nodes of the information models to obtain differential statuses for the nodes. The various versions of the nodes are then merged into a single consistent model based on the differential statuses of the nodes.

20 Claims, 37 Drawing Sheets

(56) References Cited

U.S. PATENT DOCUMENTS

| | | |
|---|---|---|
| 9,471,304 B1 | 10/2016 | Fuchs |
| 9,557,968 B1 | 1/2017 | Smith et al. |
| 10,067,755 B2* | 9/2018 | Kaminski ................. G06F 8/65 |
| 10,990,364 B2 | 4/2021 | Bach et al. |
| 11,294,665 B1* | 4/2022 | Foster ....................... G06F 8/71 |
| 11,354,102 B1* | 6/2022 | Nordqvist ................. G06F 8/51 |
| 2004/0034696 A1 | 2/2004 | Joffrain et al. |
| 2006/0168183 A1 | 7/2006 | Fuller, III et al. |
| 2006/0190105 A1 | 8/2006 | Hsu et al. |
| 2007/0283321 A1 | 12/2007 | Hedge et al. |
| 2010/0306747 A1* | 12/2010 | Pawlowsky ............. G06F 9/454 |
| | | 717/137 |
| 2013/0104099 A1* | 4/2013 | Gores ..................... G06F 8/355 |
| | | 717/104 |
| 2017/0206451 A1* | 7/2017 | Mahler ................. G06N 20/00 |
| 2018/0077030 A1 | 3/2018 | Lauer |
| 2018/0107764 A1 | 4/2018 | Bowman et al. |
| 2019/0306016 A1 | 10/2019 | Flynn |
| 2021/0089276 A1 | 3/2021 | Dunn et al. |
| 2021/0096523 A1 | 4/2021 | Stump et al. |
| 2021/0096704 A1 | 4/2021 | Ericsson et al. |
| 2021/0096824 A1 | 4/2021 | Stump |
| 2021/0096827 A1 | 4/2021 | Stump |
| 2021/0096978 A1 | 4/2021 | Stump |
| 2021/0141614 A1 | 5/2021 | Dunn |
| 2021/0165855 A1* | 6/2021 | Stuehler ................. G06F 9/454 |
| 2022/0164672 A1* | 5/2022 | Bird ....................... G06N 3/088 |
| 2022/0365775 A1* | 11/2022 | Wei ........................... G06F 8/72 |
| 2023/0236811 A1* | 7/2023 | Sundaresan ............. G06F 8/427 |
| | | 717/110 |
| 2023/0281005 A1* | 9/2023 | Groenewegen ........... G06F 8/71 |
| | | 717/120 |

OTHER PUBLICATIONS

Extended European Search Report received for European Patent Application Serial No. 22210513.2 dated May 8, 2023, 8 pages.
Engel et al., "Using a Model Merging Language for Reconciling Model Versions", Lecture Notes in Computer Science, vol. 4066, 2006, 2 pages.
Aschauer et al., "Could an Agile Requirements Analysis Be Automated?—Lessons Learned from the Successful Overhauling of an Industrial Automation System", Lecture Notes in Computer Science, vol. 5320, 2008, pp. 25-42.
Communication pursuant to Rule 69 EPC received for European Patent Application Serial No. 22210513.2 dated Jun. 26, 2023, 2 pages.
Notice of Allowance received for U.S. Appl. No. 17/554,488 dated Oct. 5, 2023, 36 pages.
Extended European Search Report received for European Patent Application Serial No. EP23176733.6 dated Nov. 15, 7 pages.
Non-Final Office Action received for U.S. Appl. No. 17/811,987, dated Sep. 18, 2024.
Schneider Electric. Scada Expert Clar Scada; pp. 1-26. 2013.

* cited by examiner

User 1 Edits ⟵ 210a

```
 1  Name: Model
 2  Type: FolderType
 3  Children:
 4   - Name: MotorType
 5     Id: g=507e2056403523e61c987447b98f39ed
 6     Supertype: BaseObjectType
 7     Children:
 8      - Name: Speed
 9        Type: BaseDataVariableType
10        DataType: Int32
11        Value: 0
12      - Name: Acceleration
13        Type: BaseDataVariableType
14        DataType: Int32
15        Value: 0
16
```
⟵ 302a

User 2 Edits ⟵ 210b

```
 1  Name: Model
 2  Type: FolderType
 3  Children:
 4   - Name: PumpType
 5     Id: g=053aa59a38447f63d4ad08f48721aafd
 6     Supertype: BaseObjectType
 7     Children:
 8      - Name: Pressure
 9        Type: BaseDataVariableType
10        DataType: Int32
11        Value: 0
12
```
⟵ 302b

FIG. 4

Merged Project ← 210

```
1  Name: Model
2  Type: FolderType
3  Children:
4  <<<<<<< HEAD
5  - Name: MotorType
6    Id: g=502e2056403523e61c987447b98f39ed
7    Supertype: BaseObjectType
8    Children:
9    - Name: Speed
10     Type: BaseDataVariableType
11     DataType: Int32
12     Value: 0
13   - Name: Acceleration     ← 502
14 =======
15 - Name: PumpType
16   Id: g=053aa59a38447f63d4ad08f48721aafd
17   Supertype: BaseObjectType
18   Children:
19   - Name: Pressure
20 >>>>>>> feature2
21     Type: BaseDataVariableType
22     DataType: Int32
23     Value: 0
24
```
302

FIG. 5

| ModelNode1 | ModelNode2 | Status |
|---|---|---|
| A | A | Matched |
| A | A* | Changed |
| A | - | Removed |
| - | A | Added |

| Diff #1 Status | Diff #2 Status | Combined Status | Merge Action |
|---|---|---|---|
| Match | Match | Match | Take Node 1 |
| Removed | Match | Removed | Take none |
| Match | Removed | Removed | Take none |
| Removed | Removed | Removed | Take none |
| - | Added | Added | Take all sub-tree of Node 2 |
| Added | - | Added | Take all sub-tree of Node 1 |
| Added | Added | Added if node attributes are identical - Added Both if outside a type - Conflict otherwise | Take Node 1 - Take Both - Take Node 1 or Node 2 |
| Changed | Match | Changed | Take Node 1 |
| Match | Changed | Changed | Take Node 2 |
| Changed | Changed | Changed if the changes are identical Conflict Otherwise | Take Node 1 - Take Node 1 or Take Node 2 |
| Changed | Removed | Conflict | Take Node 1 or Take none |
| Removed | Changed | Conflict | Take Node 2 or Take none |

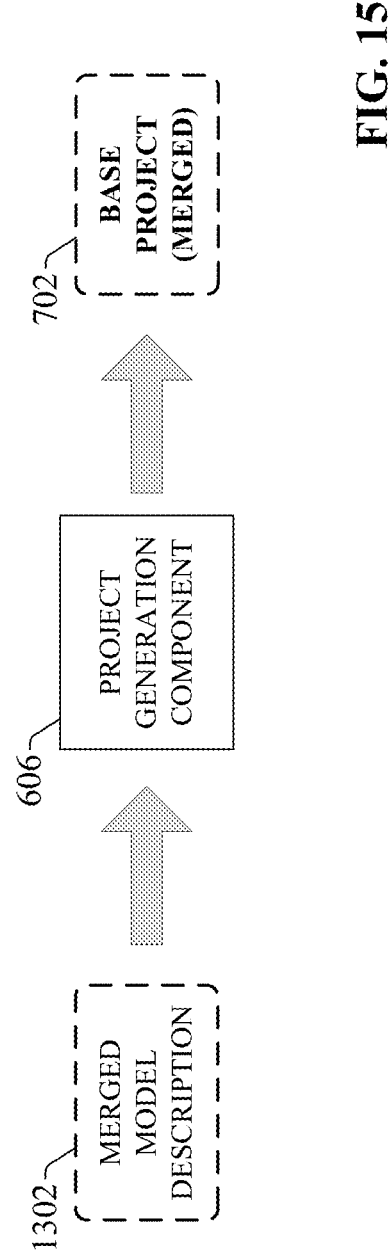

Merged Project ⟵ 702

```
 1  Name: Model
 2  Type: FolderType
 3  Children:
 4  - Name: MotorType
 5    Id: g=502e2056403523e61c987447b98f39ed
 6    Supertype: BaseObjectType
 7    Children:
 8    - Name: Speed
 9      Type: BaseDataVariableType
10      DataType: Int32
11      Value: 0
12    - Name: Acceleration
13      Type: BaseDataVariableType
14      DataType: Int32
15      Value: 0
16  - Name: PumpType
17    Id: g=3aa59a3844f63d4ad08f48721aafd
18    Supertype: BaseObjectType
19    Children:
20    - Name: Pressure
21      Type: BaseDataVariableType
22      DataType: Int32
23      Value: 0
```
⟵ 1602

FIG. 16

| Keys | en-US | it-IT |
|---|---|---|
| K1 | Speed | Velocità |
| K2 | Motor | Motore |

| Diff #1 Status | Diff #2 Status | Combined Status | Merge Action |
|---|---|---|---|
| Match | Match | Match | Take Node 1 |
| Removed | Match | Removed | Take none |
| Match | Removed | Removed | Take none |
| Removed | Removed | Removed | Take none |
| - | Added | Added | Take all sub-tree of Node 2 |
| Added | - | Added | Take all sub-tree of Node 1 |
| Added | Added | Added if node browse name and value are identical - Conflict otherwise | Take Node 1 - Take Node 1 or Node 2 |
| Changed | Match | Changed | Take Node 1 |
| Match | Changed | Changed | Take Node 2 |
| Changed | Changed | Changed if the changes are identical Conflict Otherwise | Take Node 1 - Take Node 1 or Take Node 2 |
| Changed | Removed | Conflict | Take Node 1 or Take none |
| Removed | Changed | Conflict | Take Node 2 or Take none |

Merged Translation Table
(Conflict)

```
Name: Translations
Type: FolderType
Children:
  Name: LocalizationDictionary1
  Type: LocalizationDictionary
  DataType: String
  ValueRank: OneOrMoreDimensions
  ArrayDimensions: [0,0]
  Value:
    "Type": 12,
    "Dimensions": [4,3],
    "Body": [
      "en-US", "it-IT",
      HEAD
      "Speed", "Velocità",
      "Motor", "Motore",
      "Torque", "Coppia", "Speed", "Velocità",
      "Motor", "Motore",
      "Machine", "Macchina",
      bb3d6ac Added Machine translation
```

2902c

Merged Translation Table (Conflict)

```
Name: Translations
Type: FolderType
Children:
  Name: LocalizationDictionary1
  Type: LocalizationDictionary
  DataType: String
  ValueRank: OneOrMoreDimensions
  ArrayDimensions: {0,0}
  Value:
  (
    Type: 12;
    Dimensions: {3,4};
    Body:
<<<<<<< HEAD
      "en-US", "it-IT", "es-ES",
      "Speed", "Velocità", "Rapidez",
      "Motor", "Motore", "Motor"
=======
      "en-US", "it-IT", "fr-FR",
      "Speed", "Velocità", "Rapidité",
      "Motor", "Motore", "Moteur"
>>>>>>> c6b3bc2 (Added ES locale)
  )
```

FIG. 31b

COLLABORATIVE WORK ON TRANSLATIONS IN INDUSTRIAL SYSTEM PROJECTS

BACKGROUND

The subject matter disclosed herein relates generally to industrial automation systems, and, for example, to industrial programming development platforms.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system is provided, comprising a merge component configured to merge a first edited version of a translation table and a second edited version of the translation table to yield a merged version of the translation table, wherein the merge component is configured to generate the merged version of the translation table based on a comparison of nodes defined in a first model description representing the first edited version with corresponding nodes defined in a second model description representing the second edited version.

Also, one or more embodiments provide a method, comprising receiving, by a system comprising a processor, a first edited version of a translation table; receiving, by the system, a second edited version of the translation table; comparing, by the system, nodes defined in a first model description of the first edited version with corresponding nodes defined in a second model description representing the second edited version; and merging, by the system, the first edited version with the second edited version based on a result of the comparing to yield a merged version of the translation table.

Also, according to one or more embodiments, a non-transitory computer-readable medium is provided having stored thereon instructions that, in response to execution, cause a system comprising a processor to perform operations, the operations comprising receiving a first edited version of a translation table; receiving a second edited version of the translation table; comparing nodes defined in a first model description of the first edited version with corresponding nodes defined in a second model description representing the second edited version; and merging the first edited version with the second edited version based on a result of the comparing to yield a merged version of the translation table.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 4 illustrates text representations of two locally edited versions of a system project for the collaborative editing scenario depicted in FIG. 3.

FIG. 5 is an example text representation of a merged project obtained by comparing text representations of two edited versions of a project.

FIG. 12 is a table illustrating example node differential statuses that can be identified by an industrial IDE system for each node of a project.

FIG. 14 is a table defining example merge actions that can be performed for a given node based on a combined differential status for the node.

FIG. 15 is a diagram illustrating translation of a merged model description to a merged industrial system project.

FIG. 16 is a portion of a text representation of an example merged project.

FIG. 20 is a representation of an example translation table 2000 that can be integrated with a system project.

FIG. 25 is a table defining example merge actions that can be performed for a given node based on the combined differential status for a node as determined from two sets of differential data.

FIG. 29b is a text representation of the merged translation table resulting in the integration of the two edited versions using simple text comparison.

FIG. 31b is a text representation of the merged translation table resulting in the integration of two edited versions using simple text comparison

DETAILED DESCRIPTION

Figure 1:
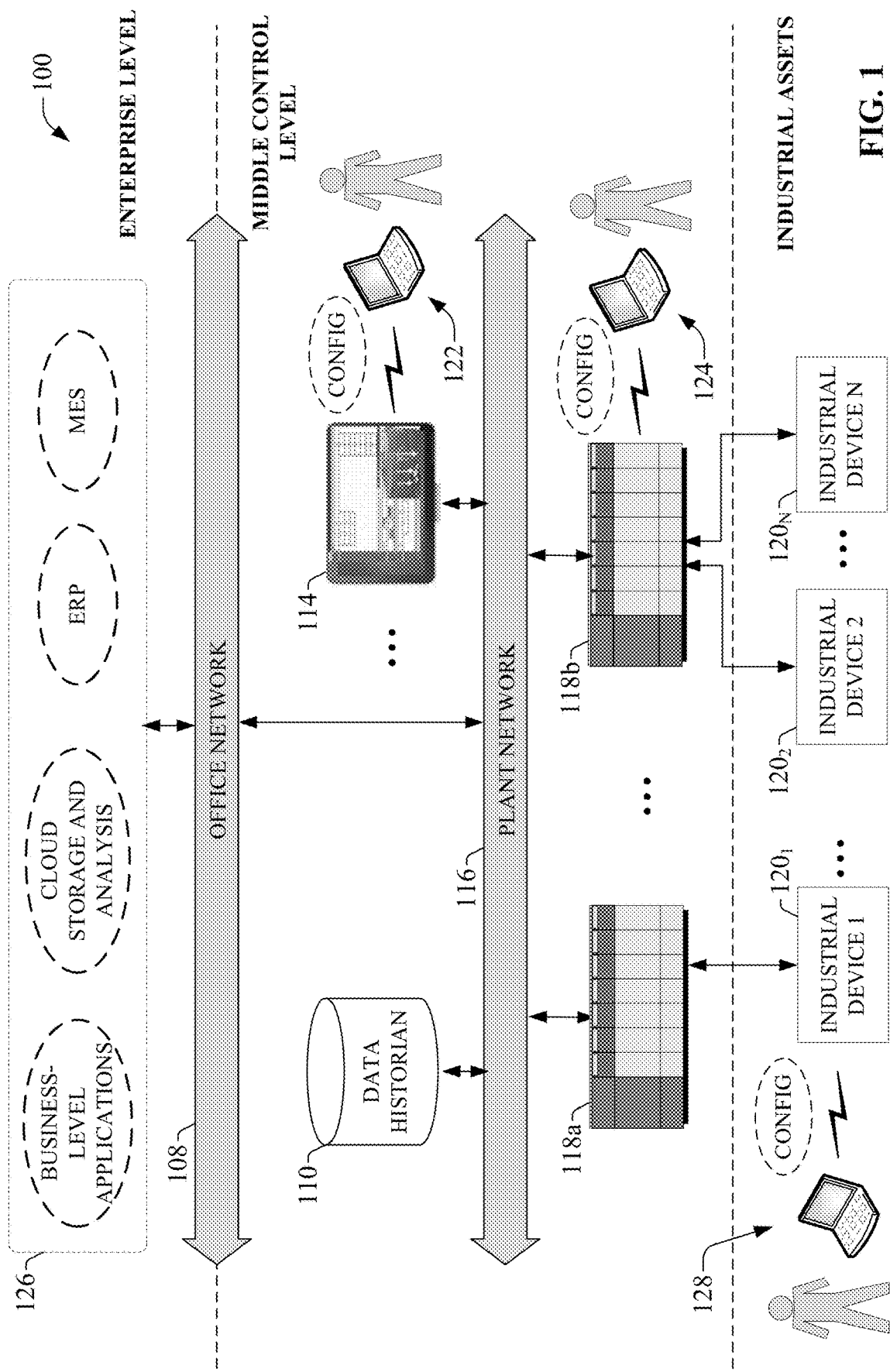
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise substantially any type of code capable of processing input signals read from the industrial devices 120 and controlling output signals generated by the industrial controllers 118, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, pumps, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by their associated control programs and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interface (HMI) terminals 114 that allow plant personnel to view telemetry and status data associated with the automation systems, and to control some aspects of system operation. HMI terminals 114 may communicate with one or more of the industrial controllers 118 over a plant network 116, and exchange data with the industrial controllers to facilitate visualization of information relating to the controlled industrial processes on one or more pre-developed operator interface screens. HMI terminals 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMI terminals 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMI terminals 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, a data historian 110 that aggregates and stores production information collected from the industrial controllers 118 or other data sources, device documentation stores containing electronic documentation for the various industrial devices making up the controlled industrial systems, inventory tracking systems, work order management systems, repositories for machine or process drawings and documentation, vendor product documentation storage, vendor knowledgebases, internal knowledgebases, work scheduling applications, or other such systems, some or all of which may reside on an office network 108 of the industrial environment.

Higher-level systems 126 may carry out functions that are less directly related to control of the industrial automation systems on the plant floor, and instead are directed to long term planning, high-level supervisory control, analytics, reporting, or other such high-level functions. These systems 126 may reside on the office network 108 at an external location relative to the plant facility, or on a cloud platform with access to the office and/or plant networks. Higher-level systems 126 may include, but are not limited to, cloud storage and analysis systems, big data analysis systems, manufacturing execution systems, data lakes, reporting systems, etc. In some scenarios, applications running at these higher levels of the enterprise may be configured to analyze control system operational data, and the results of this analysis may be fed back to an operator at the control system or directly to a controller 118 or device 120 in the control system.

The various control, monitoring, and analytical devices that make up an industrial environment must be programmed or configured using respective configuration applications specific to each device. For example, industrial controllers 118 are typically configured and programmed using a control programming development application such as a ladder logic editor (e.g., executing on a client device 124). Using such development platforms, a designer can write control programming (e.g., ladder logic, structured text, function block diagrams, etc.) for carrying out a desired industrial sequence or process and download the resulting program files to the controller 118. Separately, developers design visualization screens and associated navigation structures for HMI terminals 114 using an HMI development platform (e.g., executing on client device 122) and download the resulting visualization files to the HMI terminals 114. Some industrial devices 120—such as motor drives, telemetry devices, safety input devices, etc. —may also require configuration using separate device configuration tools (e.g., executing on client device 128) that are specific to the device being configured. Such device aconfiguration tools may be used to set device parameters or operating modes (e.g., high/low limits, output signal formats, scale factors, energy consumption modes, etc.).

Figure 2:
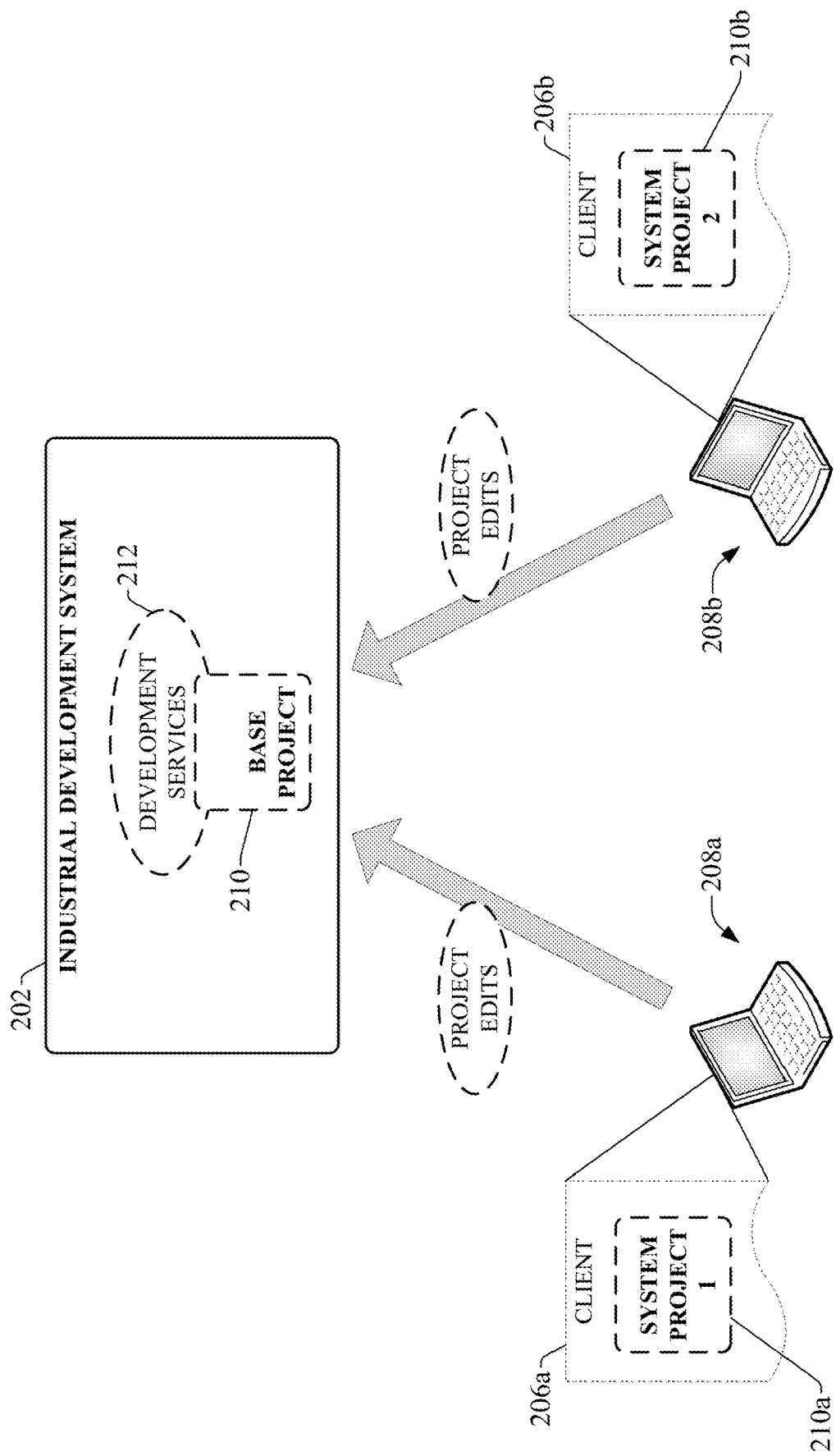
FIG. 2 is a diagram illustrating a collaborative development scenario in which multiple developers view and edit a common system project.

Some industrial project development systems support a collaborative development environment in which multiple developers are permitted to perform asynchronous development on a common system project (e.g., an HMI application, a control program, etc.). FIG. 2 is a diagram illustrating a collaborative development scenario in which multiple developers view and edit a common system project 210. In this example, an industrial development system 202 executes on a cloud platform or on a server accessible to multiple developers, who access the project development services 212 (e.g., project development interfaces and associated development tools) via clients 206 that execute on their respective client devices 208. Developers at each client device 208 can use these clients 206 to perform independent edits on local versions 210a, 210b of the system project 210 and submit these edits to the development system 202. The development system 202 then incorporates these edits into the base project 210, merging the edits received from the respective developers as necessary. Although only two developers are depicted in FIG. 2, there can be any number developers working concurrently on development of a common system project 210.

Some control development platforms manage collaborative edits by comparing and merging simple text representations of the system project 210. However, this approach can give rise to merging errors, including loss of work performed by one of the users, undesired changes to the base project 210, invalid text descriptions, improper indentation, or other such issues.

Figure 3:
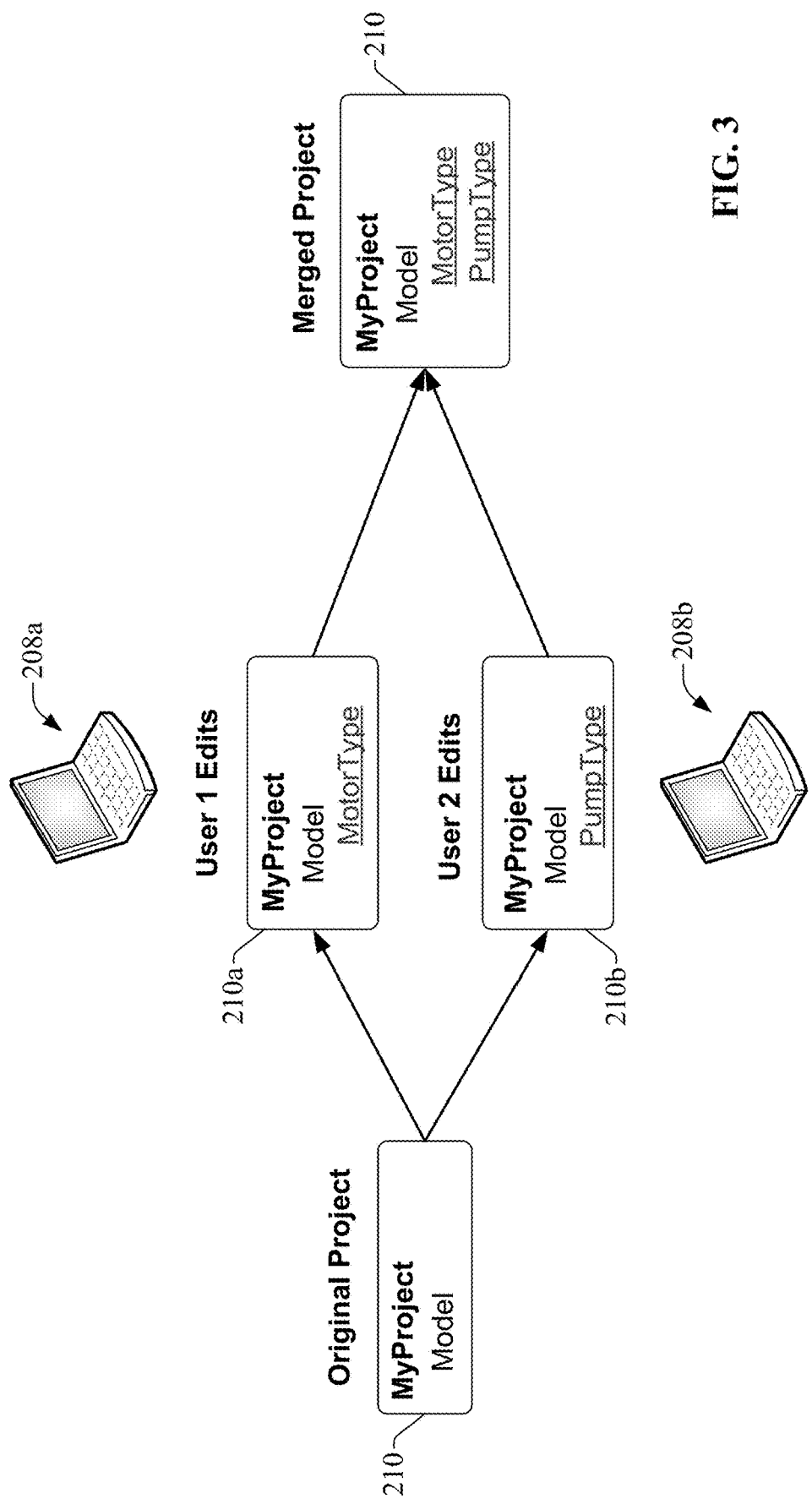
FIG. 3 is a diagram illustrating an example collaborative editing scenario in which two developers add two different asset models to a project.

This is illustrated with reference to the collaborative development scenario depicted in FIG. 3. In this example, User 1 and User 2 perform separate edits to their respective local versions 210a, 210b of a system project 210 (MyProject). The original project 210—that is, the most recent common ancestor of the two locally edited versions—includes a Model folder under which object types supported by the project 210 are defined. In the illustrated editing scenario, User 1 (at client device 208a) modifies a local version 210a of the system project 210 to add a MotorType object type to the Model folder. Separately, User 2 (at client device 208b) modifies another local version 210b of the system project 210 to add a PumpType object type to the Model folder (added elements are underlined in FIG. 3). As shown in FIG. 3, when the development system integrates the edits performed by both users into the base project 210, the resulting merged project should contain both the MotorType object type and the PumpType object type (although FIG. 3 depicts only the project elements under discussion—e.g., the Model folder and the two added object—a given system project 210 will typically comprise additional folders, objects, object instances, or other such elements).

FIG. 4 illustrates text representations of the two locally edited versions 210a and 210b of the system project 210, with shaded regions 302a and 302b indicating the lines of text that were added to the original version of the project 210 by each user (MotorType in version 210a and PumpType in version 210b). When merging the two edited versions 210a and 210b, the development system 202 detects a merge conflict since some lines of text—e.g., lines 4-8—were changed by both User 1 and User 2. This necessitates manual intervention to resolve the conflict. However, such manual intervention can result in an invalid text description (e.g., an improper indentation) or undesired changes such as the loss of work performed by one of the two users. FIG. 5 illustrates an example text representation of the resulting merged project 210, with shaded region 310 indicating the lines of text added to the original version of the project 210 to incorporate the merged user edits. As can be seen in this figure, the merged project includes improper artifacts at lines 4, 14, and 20. Also, a number of properties of the Acceleration child node 502 of the MotorType object type (e.g., type, value, etc.) have been omitted.

To address these and other issues, one or more embodiments described herein provide an industrial integrated development environment (IDE) system that supports collaborative development of industrial projects—e.g., HMI applications, industrial controller programs, device configurations, etc. —and is capable of seamlessly integrating project changes made by different developers concurrently. To this end, the IDE system can create system projects that are expressed as a unified information model that is serialized into a data serialization language such as YAML. Rather than performing comparison and merge operations on simple text files as in examples described above, the IDE system performs comparison and merge operations on abstract model descriptions using dedicated type comparison and combining algorithms to form a single consistent model that integrates independent sets of changes that were made to the project model by different developers. The system can automatically resolve conflicts and model inconsistencies without the need for manual intervention to ensure the consistency of the project's typing system.

For industrial system projects that include localized language translation tables used to translate project elements into different languages, some embodiments of the IDE system are configured to compare and merge edits made to the translation tables by different developers on their local versions of the system projects. Rather than using simple text for comparison and merging, embodiments of the IDE system can use an abstract model description representing a translation table to decompose each user's contribution to the translation table into single cell operations. The IDE system can then apply comparison, merge, and conflict resolution algorithms on the abstract model descriptions representing the translation tables.

Figure 6:
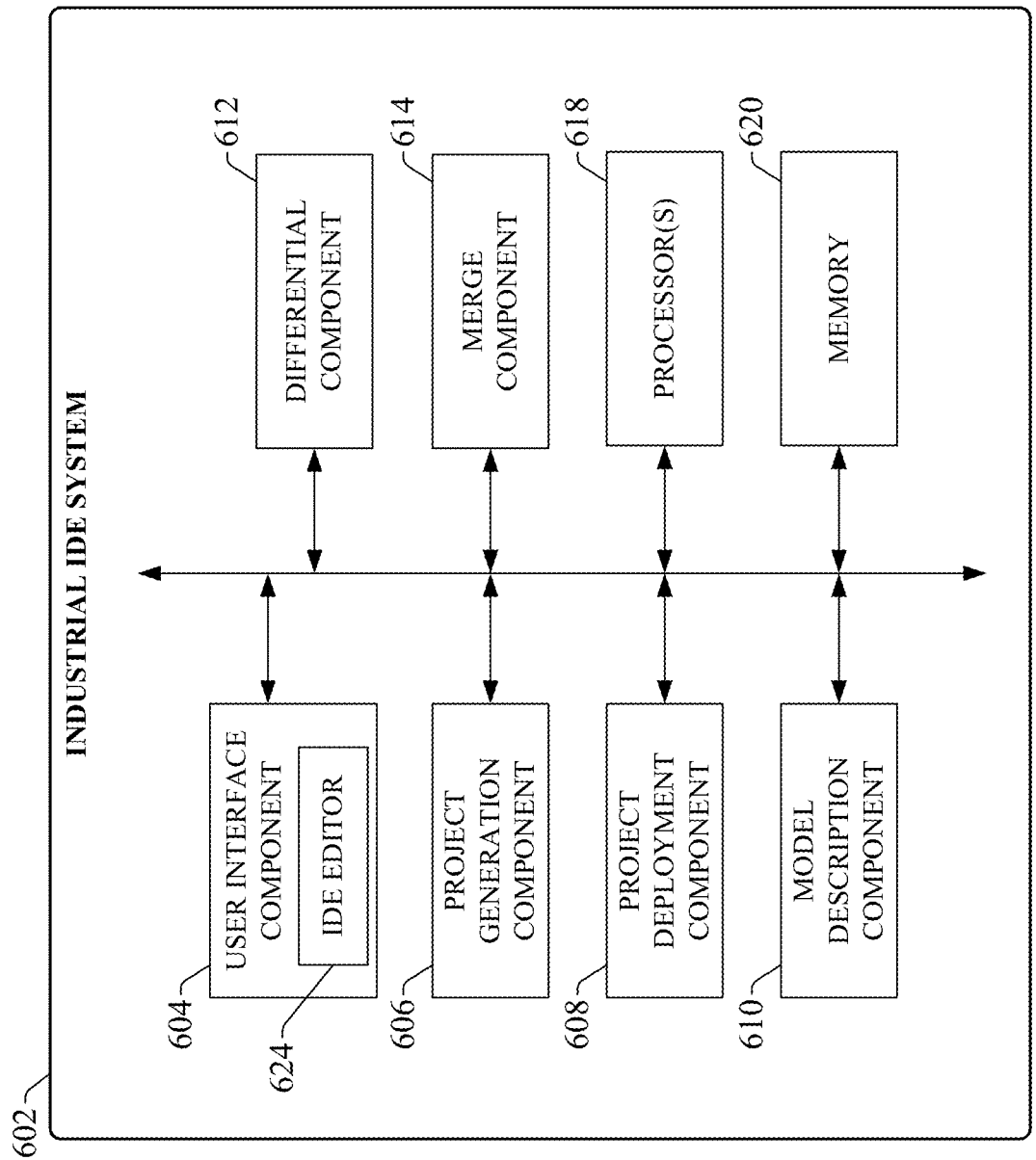
FIG. 6 is a block diagram of an example industrial integrated development environment (IDE) system.

FIG. 6 is a block diagram of an example industrial integrated development environment (IDE) system 602 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

IDE system 602 can include a user interface component 604 including an IDE editor 624, a project generation component 606, a project deployment component 608, a model description component 610, a differential component 612, a merge component 614, one or more processors 618, and memory 620. In various embodiments, one or more of the user interface component 604, project generation component 606, project deployment component 608, model description component 610, differential component 612, merge component 614, the one or more processors 618, and memory 620 can be electrically and/or communicatively coupled to one another to perform one or more of the functions of the IDE system 602. In some embodiments, components 604, 606, 608, 610, 612, and 614 can comprise software instructions stored on memory 620 and executed by processor(s) 618. IDE system 602 may also interact with other hardware and/or software components not depicted in FIG. 6. For example, processor(s) 618 may interact with one or more external user interface devices, such as a keyboard, a mouse, a display monitor, a touchscreen, or other such interface devices.

User interface component 604 can be configured to receive user input and to render output to the user in any suitable format (e.g., visual, audio, tactile, etc.). In some embodiments, user interface component 604 can be configured to communicatively interface a client device 208 (e.g., a laptop computer, tablet computer, smart phone, etc.) that is communicatively connected to the IDE system 602 via a hardwired or wireless connection. The user interface component 604 can then receive user input data and render output data via development interfaces rendered on the client device 208. Input data that can be received via interaction with these development interfaces can include, but is not limited to, control programming input (e.g., ladder logic edits or program text file edits), HMI application development input, industrial design specifications or goals, engineering drawings, AR/VR input, domain specific language (DSL) definitions, video or image data, or other such input. Output data rendered by various embodiments of user interface component 204 can include graphical or text views of a system project, programming feedback (e.g., error and highlighting, coding suggestions, etc.), programming development screens, indications of modifications made to the system project, or other such output.

Project generation component 606 can be configured to create or edit a system project comprising one or more project files based on design input received via the user interface component 604. Project deployment component 608 can be configured to commission the system project created by the project generation component 606 to appropriate industrial devices (e.g., controllers, HMI terminals, gateway devices, motor drives, AR/VR systems, etc.) for execution. To this end, project deployment component 608 can identify the appropriate target devices to which respective portions of the system project should be sent for execution, translate these respective portions to formats understandable by the target devices, and deploy the translated project components to their corresponding devices.

Model description component 610 can be configured to translate various versions of a system project into respective model descriptions representing the unified information model for those project versions. In addition, or alternatively, model description component 610 can be configured to convert translation tables into respective translation table model descriptions representing the content of those translation tables as hierarchical nodes. Differential component 612 can be configured to apply a differential algorithm to each of multiple model descriptions of locally edited project versions against the model description for the base project to yield differential outputs for each locally edited version. In the case of translation tables, differential component 612 can be configured to apply a differential algorithm to each of multiple translation table model descriptions of locally edited versions of the translation table to yield differential outputs for each locally edited version of the translation table. Merge component 614 can be configured to apply a merge algorithm to the differential outputs generated by the differential component 612 to yield a merged model description that integrates the various local edits submitted to the system 602.

The one or more processors 618 can perform one or more of the functions described herein with reference to the systems and/or methods disclosed. Memory 620 can be a computer-readable storage medium storing computer-executable instructions and/or information for performing the functions described herein with reference to the systems and/or methods disclosed.

Figure 7:
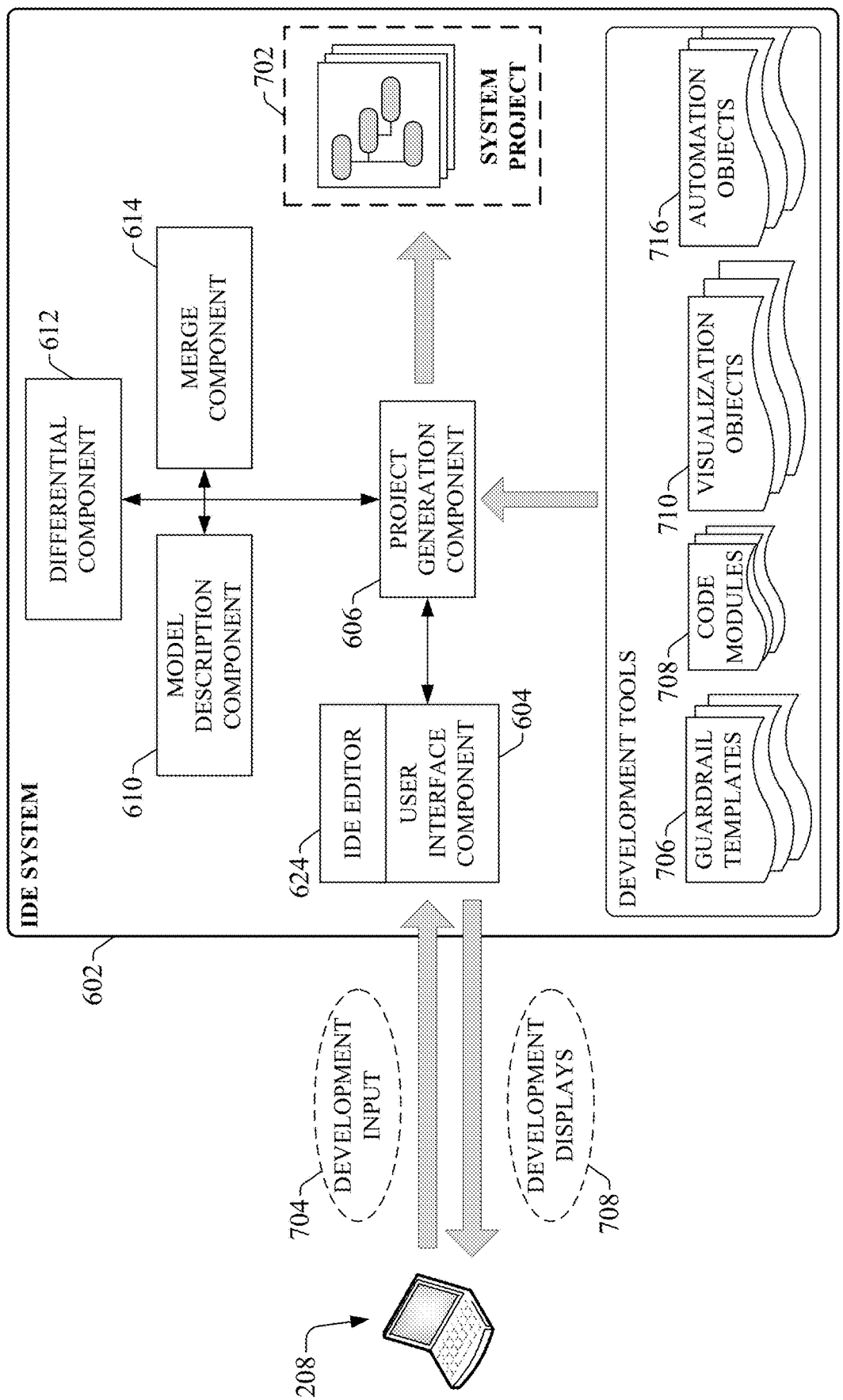
FIG. 7 is a diagram illustrating a generalized architecture and example data flows of an industrial IDE system.

FIG. 7 is a diagram illustrating a generalized architecture and example data flows of an industrial IDE system 602 according to one or more example embodiments. While the collaborative project merging techniques of the present disclosure are described in the context of an IDE system 602 having the general features discussed in connection with FIG. 7, it is to be appreciated that the project merging techniques described herein are not limited to use within such IDE systems 602, but rather can be implemented in substantially any type of industrial IDE system used to develop industrial control programs, industrial HMI applications, industrial device configuration files, or other such system projects.

A client device 208 (e.g., a laptop computer, tablet computer, desktop computer, mobile device, wearable AR/VR appliance, etc.) can access the IDE system's project development tools and leverage these tools to create a comprehensive system project 702 for an automation system being developed. The user interface component 604 can render, on the client device 208, suitable development displays 708 of a development environment that can be used to create and edit an industrial system project (e.g., an industrial controller program, an HMI application, etc.). Through interaction with these development displays 708 and the associated IDE editor 624, developers can submit development input 704 to the IDE system 602 in various supported formats, including industry-specific control programming (e.g., control logic, structured text, sequential function charts, etc.) or HMI screen configuration input.

In the case of HMI development, the IDE system 602 can maintain industry-specific, asset-specific, or application-specific visualization objects 710 that can be selectively added to an HMI application as needed. These visualization objects 710 can be classified according to industry or industrial vertical (e.g., automotive, food and drug, oil and gas, pharmaceutical, etc.), type of industrial asset (e.g., a type of machine or industrial device), a type of industrial application (e.g., batch processing, flow control, web tension control, sheet metal stamping, water treatment, etc.), or other such categories. Predefined visualization objects 710 can comprise visualizations in a variety of formats, including but not limited to HMI screens or windows, graphical objects that can be used to visualize controller data as an alphanumeric display or animated graphic, mashups that aggregate data from multiple pre-specified sources, AR overlays, VR objects representing 3D virtualizations of the associated industrial asset, or other such visualization formats.

In addition to allowing free-form control code development (e.g., ladder logic development, structured text development, etc.), some embodiments of IDE system can store predefined code modules 708 and make these code modules 708 available for selective inclusion into a system project 705. These code modules 708 comprise standardized coding segments for controlling common industrial tasks or applications (e.g., palletizing, flow control, web tension control, pick-and-place applications, conveyor control, etc.). In some embodiments, code modules 708 can be categorized according to one or more of an industrial vertical (e.g., automotive, food and drug, oil and gas, textiles, marine, pharmaceutical, etc.), an industrial application, or a type of machine or device to which the code module 708 is applicable. In some embodiments, project generation component 606 can infer a programmer's current programming task or design goal based on programmatic input being provided by a programmer (as a subset of development input 704), and determine, based on this task or goal, whether one of the pre-defined code modules 708 may be appropriately added to the control program being developed to achieve the inferred task or goal. For example, project generation component 606 may infer, based on analysis of development input 704, that the programmer is currently developing control code for transferring material from a first tank to another tank, and in response, recommend inclusion of a predefined code module 708 comprising standardized or frequently utilized code for controlling the valves, pumps, or other assets necessary to achieve the material transfer.

Figure 8:
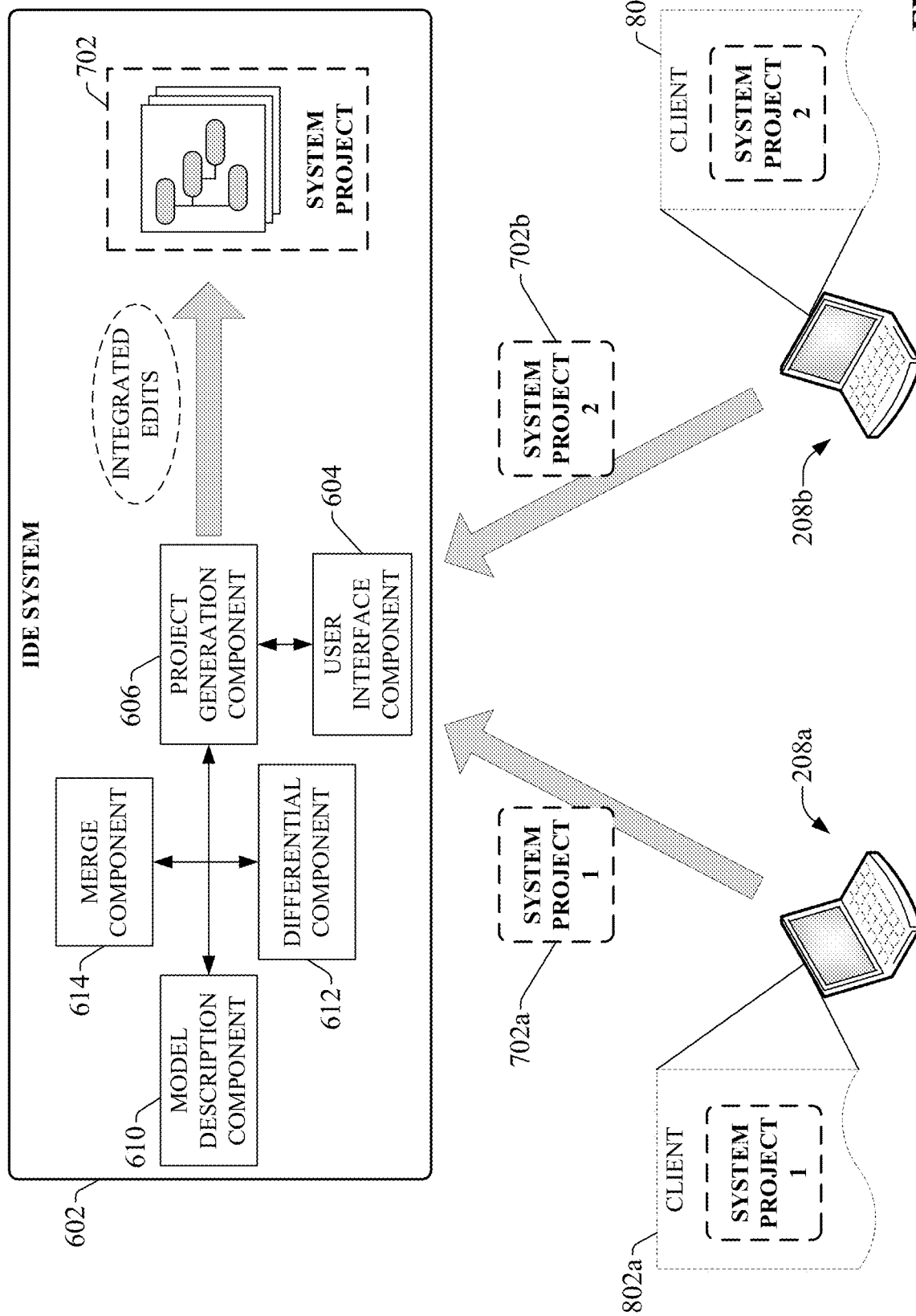
FIG. 8 is a diagram illustrating a collaborative development scenario supported by the IDE system.

Similar to development system 202 depicted in FIG. 2, IDE system 602 supports collaborative development of a common system project 702 by multiple system developers. FIG. 8 is a diagram illustrating a collaborative development scenario supported by the IDE system 602. In this example, IDE system 602 may execute on a cloud platform or server that is remotely accessible to users (via client devices 208) who are authorized to edit system project 702. The user interface component 604 can serve IDE clients 802 (e.g., thin clients) to the users' client devices 208. These IDE clients 802 serve as the development environments for viewing, creating, and editing system projects 702 (e.g., industrial controller programs, HMI applications, etc.).

During a collaborative development scenario, each of multiple users may be independently editing a local version 702a, 702b of system project 702. In some implementations, each user's local version of the project 702 may be synchronized from the IDE system 602 and stored locally on the user's client device 208 for independent local development, as depicted in FIG. 8. Alternatively, each user's local version 702a, 702b may be stored on the IDE system 602 itself, such that each local version 702a, 702b can be viewed and edited only by its designated user while being segregated from other users' versions of the project 702.

At various stages of the collaborative development process, the IDE system 602 may be required to integrate the various edits submitted by multiple users into the base system project 702, as described above. In the illustrated example, two developers have performed different edits to their respective versions 702a, 702b of the system project and have submitted the resulting edited local versions— System Project 1 and System Project 2—for integration into the main system project 702. Accordingly, the IDE system 602 includes a model description component 610, differential component 612, and merge component 614 which perform a comparison and merge workflow on these edited local versions 702a, 702b to integrate the users' edits seamlessly and accurately into the system project 702. As will be described in more detail below, in order to mitigate the need for manual conflict resolution and to reduce the risk of undesired changes or loss of work, the IDE system 602 performs this comparison and merge workflow on model descriptions of the various versions of the project 702 rather than on simple text file representations of the project versions.

The comparison and merge workflow carried out by the IDE system 602 is now described. After each user has applied a set of edits to their respective local versions of the system project 702 and submitted the resulting edited versions 702a, 702b to be merged with the base system project 702, the merge process can be initiated. In some embodiments the merge process may be initiated manually by one of the users or by another user with administrator privileges.

Figure 9:
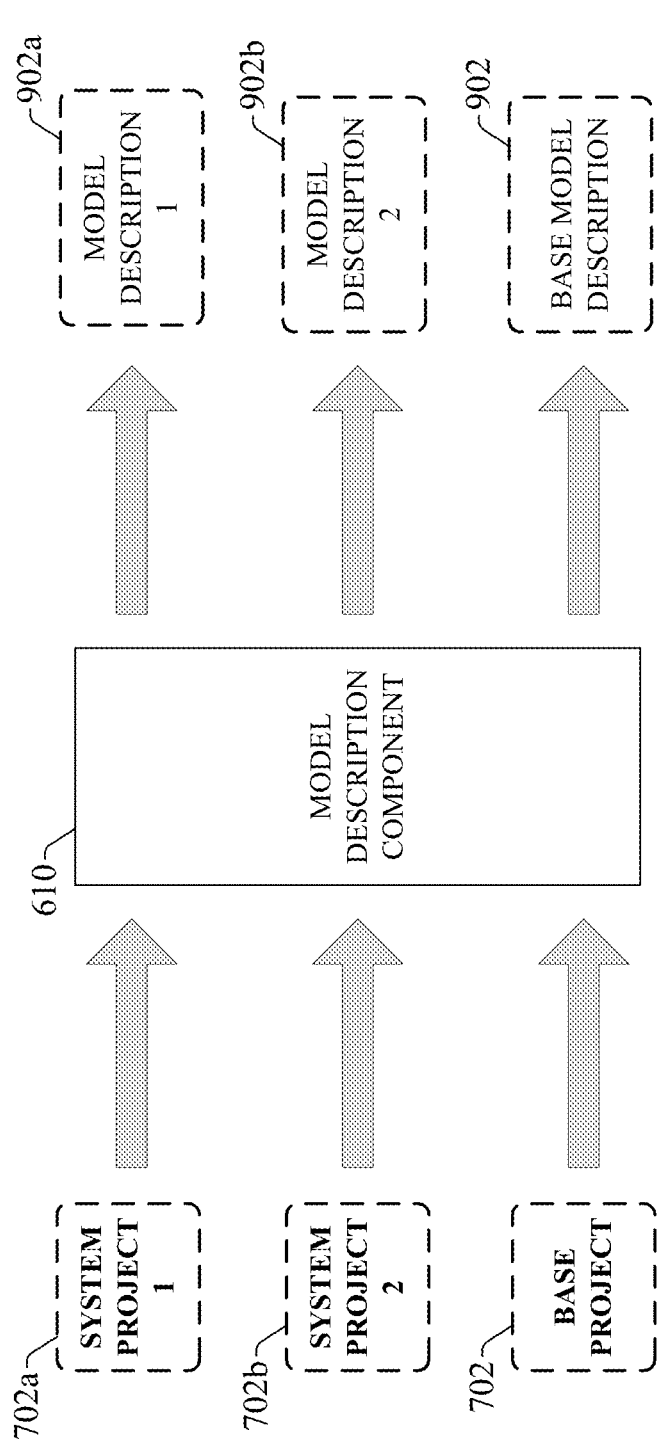
FIG. 9 is a diagram illustrating conversion of locally edited project versions and a base project into their corresponding model descriptions.
Figure 10:
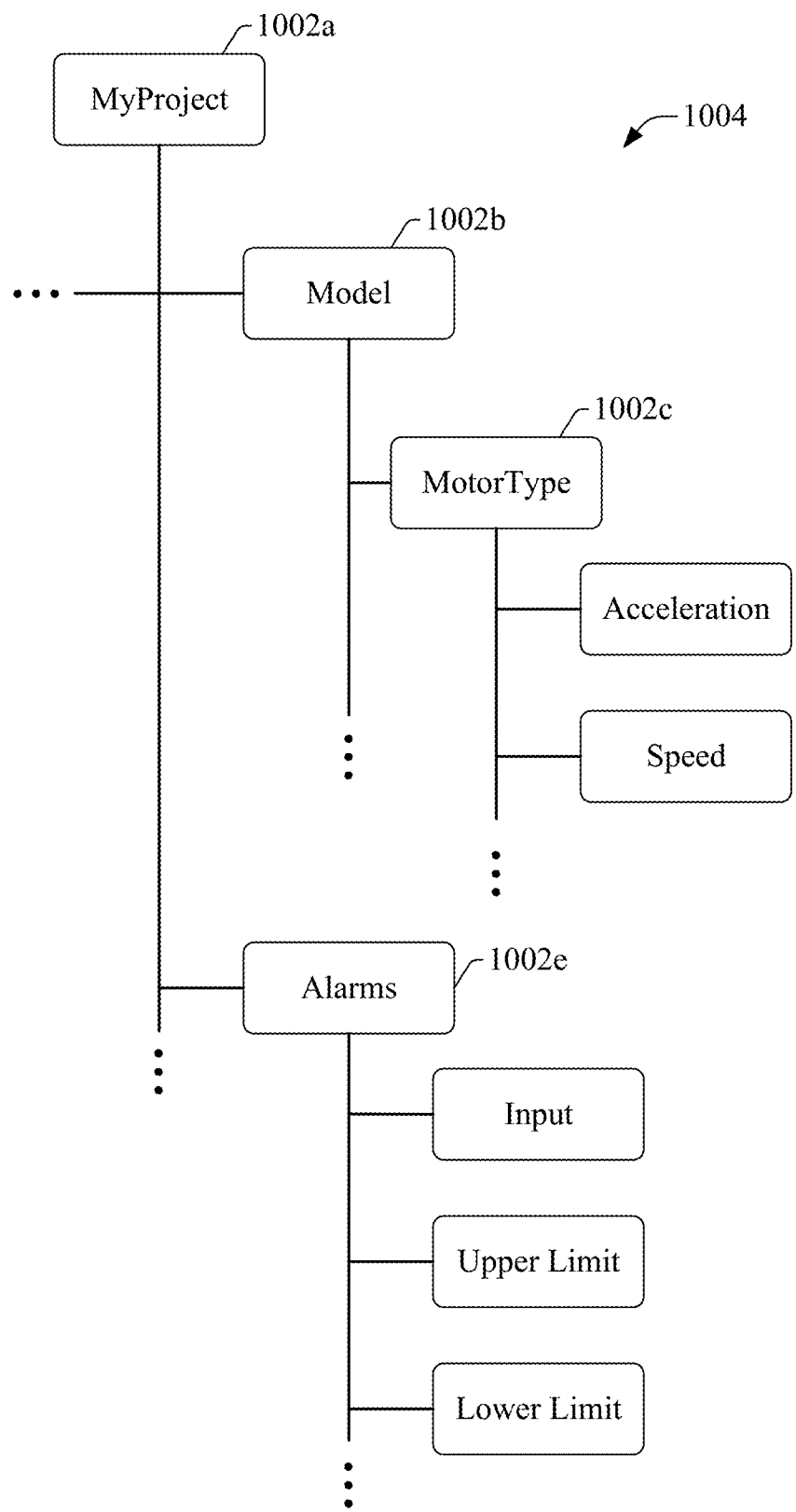
FIG. 10 is a portion of an example information model representing a system project.

As an initial step of the merge process, the IDE system 602 obtains information model descriptions for each of the local project versions 702a, 702b as well as for the base system project 702. FIG. 9 is a diagram illustrating the conversion of the local project versions 702a, 702b and the base project 702 into their corresponding model descriptions 902. In general, each version of the system project 702 can be represented as a unified information model (e.g., an OPC UA Address Space model or another type of information model) that represents the content of the project as a hierarchical representation of nodes. FIG. 10 is a portion of an example information model 1004 representing a system project 702. In this example a system project (MyProject) is represented by a parent node 1002a, with elements of the project represented as child nodes and associated sub-nodes below the parent node 1002a.

Project elements represented by nodes 1002 of the information model 1004 depend on the type of project 702 (e.g., HMI application, controller program, etc.) and can include, but are not limited to, asset models and their associated properties or values (e.g., a pump model, a motor model, etc.), recipes and their associated values, alarms and their associated parameters, graphical elements of an HMI interface, or other such project elements. The information model 1004 organizes the nodes 1002 representing these project elements hierarchically to reflect their relationships. In the portion of the example information model 1004 depicted in FIG. 10, the project includes a Model folder (node 1002b) under which are defined a number of asset model definitions, including a MotorType model (node 1002c) and its associated properties (e.g., Acceleration, Speed, etc.). Asset models can be instantiated within the project 702 by the developer as needed, with each instance of an asset model inheriting the type structure (e.g., properties, values, attributes, data fields, etc.) of its corresponding model definition. Although not shown in the information model portion 1004 of FIG. 10, each instance of a model or object will also be represented by a set of nodes having the same type structure as that of its parent model or object definition.

Example information model 1004 also includes an Alarms node 1002e having associated sub-nodes representing the alarm's parameters (e.g., the input whose value will trigger the alarm, upper and/or lower limits of the input value that will trigger the alarm, etc.).

In general, the information model representation of a system project 702 encodes knowledge of the content, typing system, semantics, and organization of project elements that make up the system project 702. As will be described in more detail herein, this information model will be the basis for comparison between the edited local versions 702a, 702b of the system project and the base project 702. In particular, rather than performing a comparison of corresponding lines of simple text without knowledge of the meaning of project elements, as in the example described above in connection with FIGS. 4 and 5, IDE system 602 will perform a comparison of the nodes of each project version's information model to identify which project elements have been added, removed, or modified.

Figure 11:
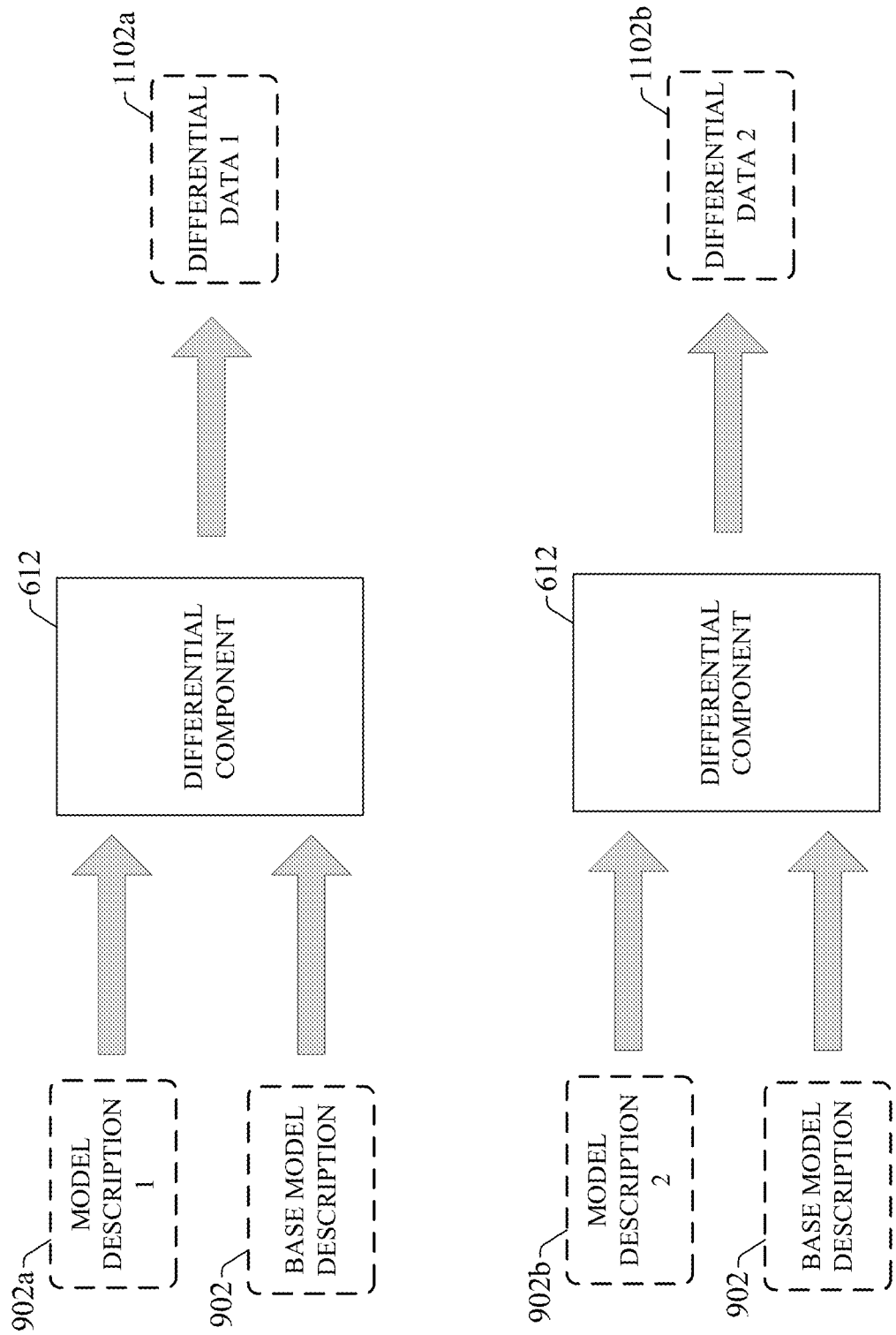
FIG. 11 is a diagram illustrating comparison of model descriptions to yield differential data.

Returning now to FIG. 9, the model description component 610 translates each locally edited project version 702a, 702b as well as the base project 702 to its corresponding information model representation, or model descriptions 902. Next, the model descriptions 902a, 902b generated for the locally edited project versions 702a, 702b are each compared to the model description 902 generated for the base project 702. FIG. 11 is a diagram illustrating comparison of the model descriptions to yield differential data. The differential component 612 identifies the changes performed on each of the locally edited project versions 702a, 702b relative to the base project 702 by comparing each model description 902a, 902b representing the locally edited project versions 702a, 702b with the base model description 902 representing the base project 702. Based on these comparisons, the differential component 612 generates differential data 1102 identifying differences between each locally edited version 702a, 702b and the base project 702. In the example depicted in FIG. 11, the comparison between model description 902a (representing the first locally edited version 702a) and model description 902 (representing the base project 702) yields differential data 1102a, and the comparison between model description 902b (representing the second locally edited version 702b) and model description 902 (representing the base project 702) yields differential data 1102a.

As noted above, rather than comparing corresponding lines of simple text without knowledge of the meaning or organization of the project content, differential component 612 compares corresponding nodes 1002 of the information models of the edited versions 702a, 702b and the base project 702 (as represented by the model descriptions 902, 902a, and 902b), and the resulting differential data 1102 identifies a differential status for each node 1002. FIG. 12 is a table 1202 illustrating example differential statuses that can be identified by differential component 612 for each node 1002 based on this node-by-node comparison. In this example, it is assumed that ModelNode1 is a node 1002 in the base project model description 902 and that ModelNode2 is a corresponding node 1002 in one of the edited model descriptions 902a or 902b for one of the locally edited versions 702a, 702b. As shown in the first row of table 1202, if a node 1002 representing a given project element is discovered in both the base model description 902 and the edited model description 902a, 902b, and the node 1002 is identical in both versions (both having state A), differential component 612 assigns a Match status for that node (as shown in the first row of table 1202). If the node 1002 is found in both model descriptions but have different states (state A and state A*, respectively), as shown in the second row of table 1202, differential component 612 assigns a Changed status to the node 1002 to indicate that the corresponding project element has been edited in the local version 702a or 702b. If the node 1002 is found in the base model description 902 but is not found in the edited model description 902a, 902b, as shown in the third row of table 1202, differential component 612 assigns a Removed status to the node 1002 indicating that the corresponding project element has been deleted in the local version 702a or 702b. If the node 1002 is found only in the edited model description 902a, 902b but has no corresponding node in the base model description 902, as shown in the fourth row of table 1202, differential component 612 assigns an Added status for that node to indicate that the corresponding project element has been newly added by the developer. The differential data 1102 for each locally edited version 702a, 702b records the differential statuses of each node 1002 in the locally edited version relative to the base project 702.

Figure 13:
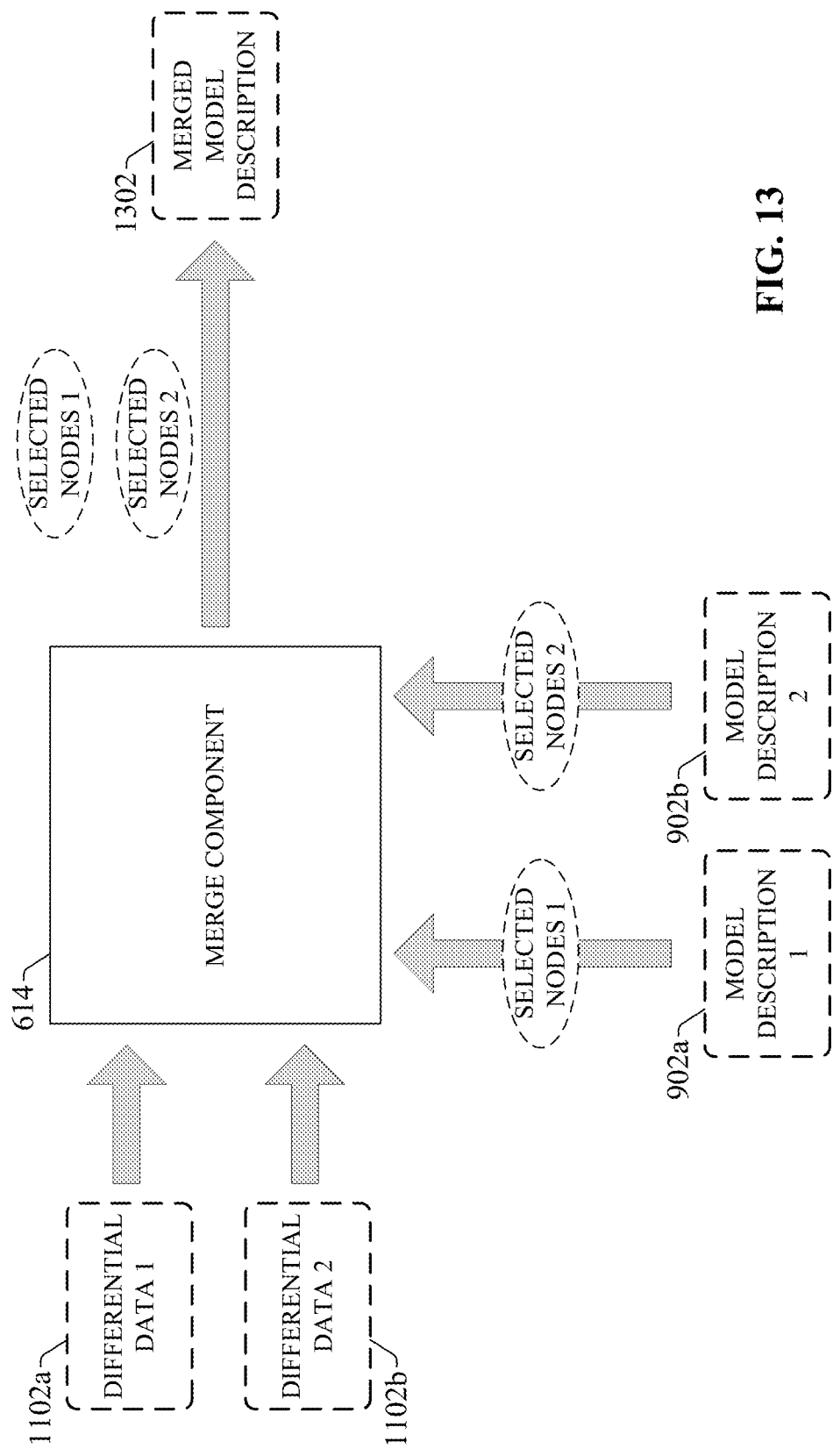
FIG. 13 is a diagram illustrating integration of two sets of edits into a merged model description based on analysis of two sets of differential data obtained for the edited versions of a project.

Once the differential component 612 has generated differential data 1102 for each of the locally modified versions 702a and 702b, the system's merge component 614 generates a merged model description based on analysis of the sets of differential data 1102a, 1102b. FIG. 13 is a diagram illustrating integration of the two sets of edits into a merged model description 1302 based on analysis of the two sets of differential data 1102a and 1102b. The merged model description 1302 is an integration of the two edited model descriptions 902a and 902b and represents the hierarchical information model for an updated project 702 that integrates the project edits submitted by the multiple users. The merge component 614 can create the merged model description 1302 by selecting, for each node 1002 representing a given project element, a version of the node 1002 from one of the two edited model descriptions 902a or 902b, or an integration of the two versions of the node 1002. The merge component 614 selects the version of the node 1002 to be included in the merged model description 1302 based on a combined differential status of each node 1002, which itself is based on the individual differential statuses recorded in the differential data 1102a and 1102b for the two edited versions.

FIG. 14 is a table 1402 defining example merge actions that can be performed for a given node 1002 based on the combined differential status for the node 1002 as determined from the two sets of differential data 1102a and 1102b. In this example Diff #1 Status is the differential status for a node of the information model (e.g., Match, Removed, Added, or Changed) recorded in the first set of differential data 1102a (corresponding to the first locally edited version 702a) and Diff #2 Status is the status of the same node 1002 recorded in the second set of differential data 1102b (corresponding to the second locally edited version 702b). The merge component 614 determines a combined differential status for the node 1002 based on the combination of these two differential statuses, and determines a merge action for the node based on the combined differential status.

For example, if both sets of differential data 1102a and 1102b indicate a Match status for the node 1002—indicating that the node 1002 was not modified relative to the base project 702 in either of the two locally edited versions 702a or 702b—the merge component 614 assigns a Match status to the node 1002 as the combined status. Since this status indicates that the node 1002 was not modified in either of the two local versions 702a or 702b, the merge action corresponding to this Match status is to maintain the node in its present state; e.g., by taking the unedited node 1002 from either Model Description 1 (902a) or Model Description 2 (902b) for inclusion in the merged model description 1302.

If one of the two sets of differential data 1102a or 1102b indicate a Removed status for the node 1002 and the other set indicates a Match status—indicating that one user has deleted the node 1002 while the other user has left the node 1002 unchanged—the combined status for the node 1002 is set to Removed, and the corresponding merge action is to omit this node 1002 from the merged model description 1302. Similarly, if both sets of differential data 1102*a* and 1102*b* indicate a Removed status for the node 1002, the combined status is set to Removed and the node 1002 is omitted from the merged model description 1302.

If either of the two sets of differential data 1102*a* or 1102*b* include a node 1002 having an Added status which is not present in the other set of differential data, the combined status for this node 1002 is designated as Added, and this node 1002 and its associated subtree (e.g., any child nodes associated with the added node 1002) is taken from the corresponding model description 902*a* or 902*b* for inclusion in the merged model description 1302.

If both sets of differential data 1102*a* and 1102*b* indicate a node 1002 having an Added status at corresponding locations within the information model hierarchy, the combined status and corresponding merge action for the node 1002 can depend on the contents of the respective versions of the added node 1002. For example, if both versions of the added node 1002 are identical—indicating that both users have added identical project elements having identical configurations—the combined status for the node 1002 is set to Added and the new node 1002 is taken from either of the two model descriptions 902*a* or 902*b* for inclusion in the merged model description 1302. In some scenarios, it may be determined that both versions of the added node 1002 should be taken from their respective model descriptions 902*a* and 902*b* for inclusion in the merged model description 1302; e.g., if the added node 1002 is outside a type definition. In other scenarios, it may be found that the two versions of the added node conflict with each other (yielding a combined status of Conflict). In this case, the merge component 614 can generate a request for a manual intervention from a user or administrator to resolve the conflict (e.g., by asking the user to select one of the two conflicting versions of the added node 1002 for inclusion in the merged model description 1302).

If either of the two sets of differential data 1102*a* or 1102*b* indicate a Changed status for the node 1002 while the other set of differential data indicates a Match status—indicating that one of the users has modified the corresponding project element while the other user has left the project element unedited—the combined status is given as Changed, and the node 1002 having the Changed status is taken from the corresponding model description 902*a* or 902*b* for inclusion in the merged model description 1302. If the node 1002 is indicated as being Changed in both sets of differential data 1102*a* and 1102*b*, the combined status of the node 1002 will depend on the nature of the respective changes. For example, if the two modified nodes are identical—indicating that both users applied the same edit to the same project element—the combined status is given as Changed and the node 1002 is taken from either of the two model descriptions 902*a* or 902*b* for inclusion in the merged model description. Alternatively, if the changes to the node 1002 are not identical, the edits are indicated as being in conflict, and the merge component 614 requests a manual intervention to resolve the conflict (e.g., by asking the user to select one of the two versions of the node 1002 for inclusion in the merged model description 1302).

Similarly, if one of the two sets of differential data 1102*a* or 1102*b* indicate that the node 1002 has been changed while the other set of differential data indicates that the node 1002 has been removed—indicating that one user has deleted a project element that the other user has edited but left in place—the merge component 614 indicates that the edits are in conflict and generates a request for a manual intervention to resolve the conflict (e.g., by asking the user to select whether to remove the node 1002 or to include the changed version of the node in the merged model description 1302).

In some embodiments, rather than generating a request for a manual intervention to resolve any of the conflict scenarios discussed above, the merge component 614 can be configured to automatically resolve the conflict by selecting from among the conflicting versions of a node 1002 based on a defined selection criterion.

Returning now to FIG. 13, the merge component 614 determines a suitable merge action for each node 1002 in the model descriptions 902*a* and 902*b* based on the combined differential statuses of the nodes 1002 (e.g., in accordance with the status-based merge actions tabulated in FIG. 14) and generates the merged model description 1302 by applying these merge actions to the nodes 1002. Prior to translating this merged model description 1302 to an updated base project 702, the merge component 614 can apply a sanitization process to the merged model description 1302 to ensure project-wide consistency of the project's typing system or standards. This sanitization process can be based on encoded knowledge of the project's typing system. For example, it may be known that an alarm definition for an HMI project must have an associated set of configuration parameters, including but not limited to an input parameter, an upper and/or lower limit parameter, an alarm type parameter (e.g., analog or digital), or other such parameters. Accordingly, as part of the sanitization process, the merge component 614 can examine all nodes 1002 corresponding to an alarm definition to ensure that each of these nodes has the appropriate number and types of child nodes corresponding to these alarm parameters. All such nodes 1002 can be sanitized in this manner, including but not limited to nodes 1002 corresponding to asset models, recipes, HMI graphical objects, ladder logic instruction blocks, or other such elements. If a node 1002 is found to be inconsistent with the project's typing system, the merge component 614 can modify the node 1002 as needed to bring the node 1002 into consistency with the typing system.

In another example, the merge component 614 can compare each instance of an object within the merged model description 1302 with its corresponding object type definition to ensure that the instance includes all the variables, properties, or attributes of the parent object definition. Model instances that are not consistent with their corresponding model definitions can be automatically corrected by the merge component 614 (e.g., to add any missing properties or parameters).

Once the merged model description 1302 has been generated, the project generation component 606 can translate the merged model description 1302 to an updated base project 702 that properly integrates the two sets of collaborative edits, as shown in FIG. 15.

This node-level comparison and merge workflow can more accurately and intelligently merge the two sets of edits relative to comparing lines of simple text, since the comparison is performed between corresponding nodes 1002 (representing project elements of the system project 702) of the two edited versions of the hierarchical information model. This approach takes into consideration the organization of project elements that make up the project 702, ensuring that corresponding project elements of the two edited versions are being compared for the purpose of detecting project edits. This approach can also reduce or eliminate instances of false conflicts when merging collaborative edits, since the IDE system 602 does not raise a conflict based merely on discovery of mismatched lines of code. Instead, the IDE system 602 examines and compares corresponding nodes of the model descriptions 902a and 902b of the edited projects, and as such does not raise conflicts that might otherwise be raised by systems that compare corresponding lines of simple text files.

FIG. 16 is a portion of a text representation of an example merged project 702 obtained using this compare and merge workflow for the collaborative editing scenario described above in connection with FIG. 3, whereby User 1 modifies a local version of the system project to add a MotorType object type and User 2 separately modifies another local version of the system project to add a PumpType object type. In contrast to the merged project depicted in FIG. 5 obtained by comparing corresponding lines of text between the two edited text representations, the merged project 702 depicted in FIG. 16 has properly added the PumpType object type (indicated by shaded region 1602) and the MotorType object type—including all their corresponding attributes and variables—without the need for manual conflict resolution and without improper text artifacts or loss of work. This is because, rather than comparing corresponding lines of edited text within the simple text representations, the IDE system 602 detected each added object as a node 1002 of its corresponding model description 902a or 902b having an Added differential status, and consequently added the entireties of each node 1002 (including their child nodes) to the merged model description 1302.

Figure 17:
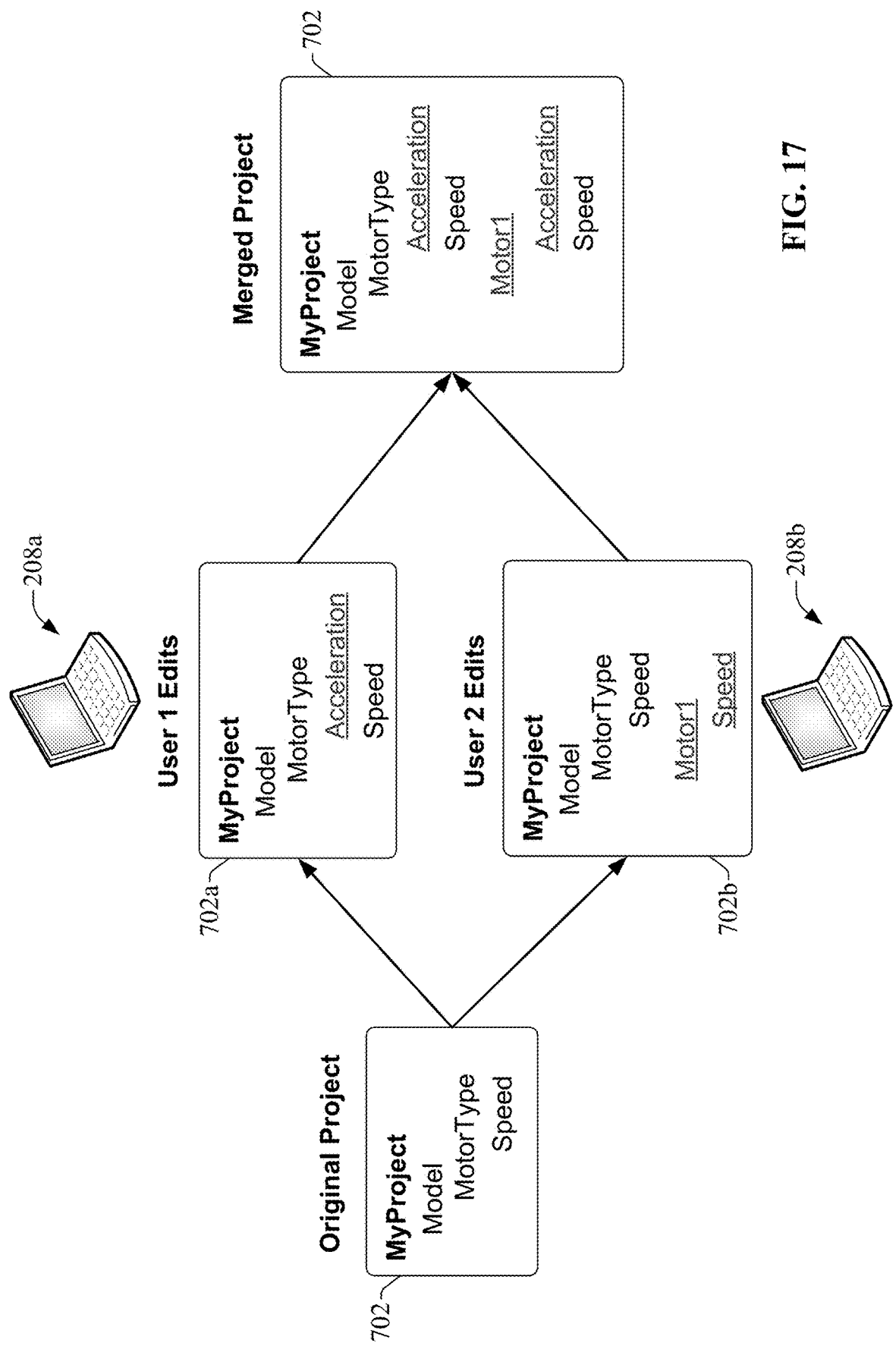
FIG. 17 is a diagram illustrating another collaborative development scenario in which a first developer adds a variable to an asset model and a second developer separate adds an instance of the asset model.

FIG. 17 is a diagram illustrating another collaborative development scenario. In this example, the original project 702 (MyProject) includes a model folder under which is defined a MotorType object type having an associated Speed variable. User 1 (at client device 208a) modifies a local version 702a of the project to add an Acceleration variable to the MotorType object type. Separately, User 2 (at client device 208b) edits another local version 702b of the project to create an instance of the MotorType object type called Motor1. This Motor1 instance inherits the variables of the parent MotorType object type (the Speed variable in this case). When both users' edits are merged into a new base project 702, both the MotorType object type and its Motor1 instance should include both the original Speed variable as well as the Acceleration variable added by User 1 in order to maintain consistency of the typing system. That is, although the Acceleration variable was not defined for the MotorType object type in the local version 702b of the project edited by User 2, the Motor1 instance should nevertheless inherit the Acceleration variable added by User1 in local version 702a.

Figure 18:
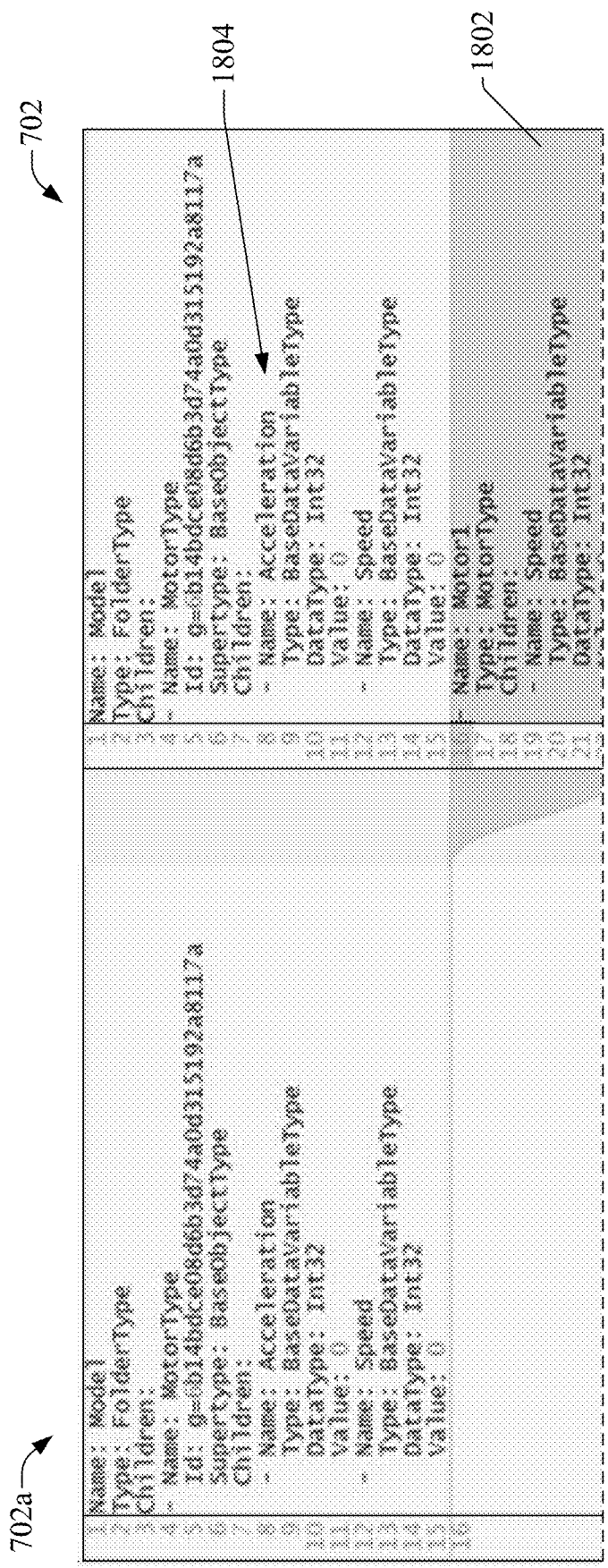
FIG. 18 illustrates text representations of the first and second edited versions of the system project and the merged project for the scenario depicted in FIG. 17 if simple text comparison is used to integrate the two sets of edits.

FIG. 18 illustrates text representations of the first local version 702a edited by User1 and the merged project 702 if simple text comparison is used to integrate the two sets of edits. As can be seen in the text version of the merged project 702, the Acceleration variable 1804 has been added to the MotorType object type in accordance with the merging of local version 702a. However, since comparing the lines of text yields no merge conflicts, the Motor1 instance (indicated by shaded region 1802) is added to the merged project 702 in the form in which it was added to the local version 702b by User2, without the Acceleration variable. Thus, the integration yields an inconsistency with the typing system, since the Motor1 instance of the MotorType object does not include all the variables contained in the type definition.

Figure 19:
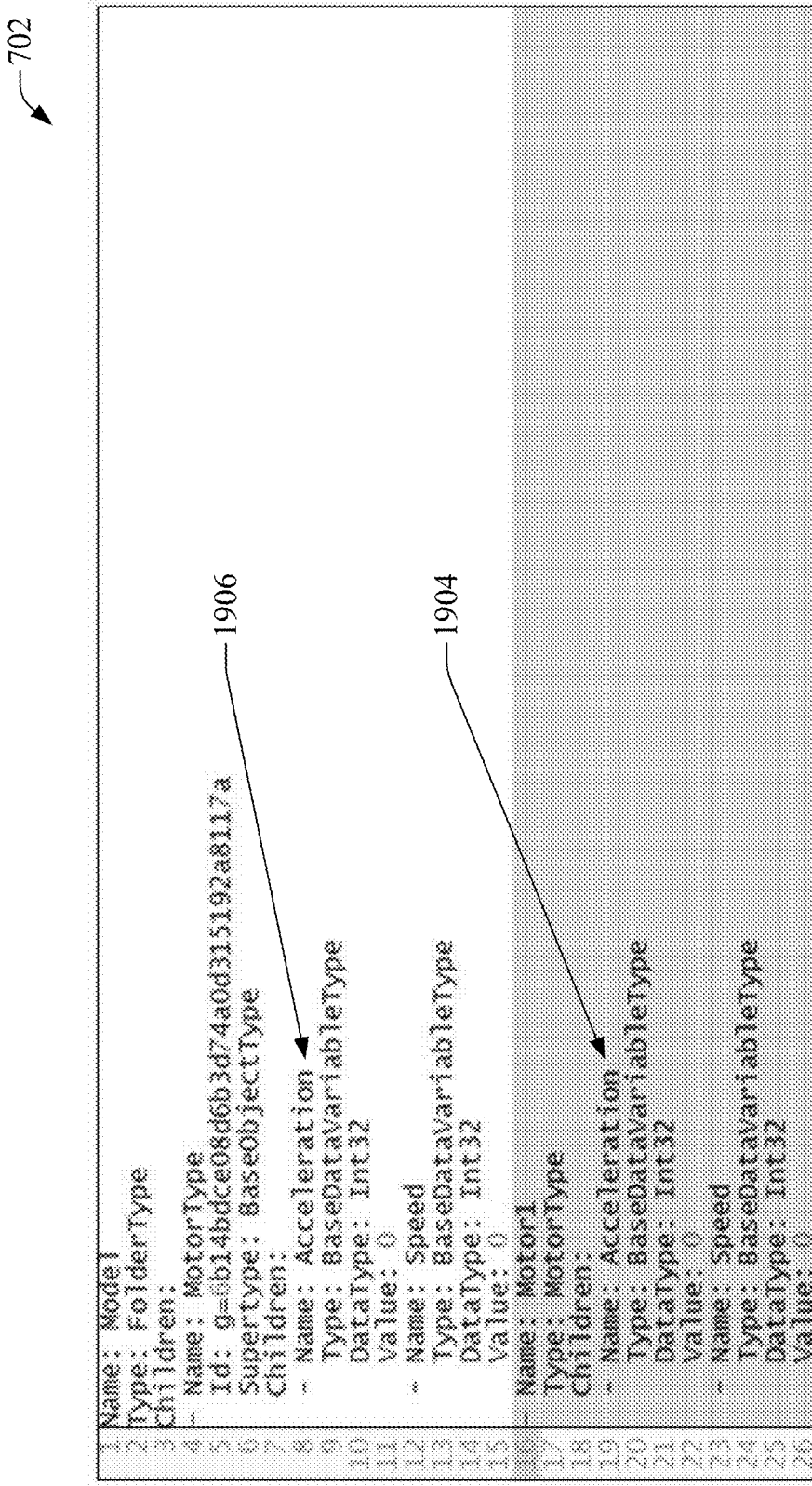
FIG. 19 is a text representation of a merged project obtained for the scenario depicted in FIG. 17 when a node-based compare and merge workflow is used to integrate the two edited versions.

By contrast, FIG. 19 is a text representation of the merged project 702 when the node-based compare and merge workflow discussed above is used to integrate the two local versions 702a and 702b. The model descriptions 902a and 902b for each of the two local versions 702a and 702b have been compared with the model description of the original project 702 on a node-by-node basis to yield differential data 1102a and 1102b (see FIG. 11), and the two model descriptions 902a and 902b have been merged based on the combined differential status of each node to yield a merged model description 1302 (see FIGS. 13 and 14). As a final step, a sanitization process has been applied to the merged model description 1302 to ensure that the project's typing system is consistent throughout the merged project. In this case, the sanitization process discovers that the Motor1 instance is missing an Acceleration variable that is defined in the MotorType object type (Acceleration variable 1906) and adds this missing Acceleration variable 1904 to the Motor1 instance accordingly to enforce consistency of the typing system.

To allow for collaborative development and usage of system projects 702 by users in different countries who may not share a common language, some system projects 702 can offer multi-language support using local translation tables included with the projects 702. FIG. 20 is a representation of an example translation table 2000 that can be integrated with a system project 702. A translation table 2000 can be an integrated table, file, or text segment that is referenced by the project 702 to facilitate switching a language in which the system project 702 is displayed on a client device. Each entry or row of the translation table 2000 corresponds to a word or piece of text used in the project 702; e.g., a label or description string applied to a programmatic or visual element of the project 702, a tag name, or other such text elements of the project 702. The first column of the translation table 2000 ("Keys") represents the translation keys— e.g., K1, K2, etc. —for a given word or text translation. These keys serve as row headers for the table 2000, uniquely identifying each entry of the table. Subsequent columns ("en-US," "it-IT") represent translations of the text in respective different language (English and Italian in the example table 2000 depicted in FIG. 20). For simplicity, table 2000 only depicts two translation entries. Translation key K1 defines a translation of the English word "Speed" ("Velocita" in Italian), and translation key K2 defines a translation of the English word "Motor" ("Motore" in Italian).

Translation tables 2000 can be encoded in a system project 702 and used by local versions of the project 702 (e.g., local versions 702a or 702b) to convert instances of each word represented in the table 2000 to a selected one of the languages, either based on a user's explicit selection of a preferred language or dynamically based on an inference of a preferred language to be used on the local instance of the project 702. Selection of a preferred language is applied to the user's local version of the project 702 executing on client device 208.

In a collaborative development scenario as described above in connection with FIG. 8, users at client devices 208 may perform separate edits to their respective local versions of the translation table 2000 on their corresponding local versions 210a, 210b of a system project 210. These edits may involve, for example, adding new entries to the table 2000 to define a translation for a new word or text string, or modifying an existing entry of the table 2000 to change a spelling of one of the language-specific versions of a word. At certain stages of the collaborative development process, the IDE system 602 may be required to integrate the various edits to the translation table 2000 submitted by multiple users into a base version of the translation table 2000 associated with the base system project 702. Similar to the merging of project edits as described above, the model description component 610, differential component 612, and merge component 614 can perform a comparison and merge workflow on these edited versions of the translation table 2000 to integrate the users' translation table modifications seamlessly and accurately into the system project 702.

The comparison and merge workflow carried out by the IDE system 602 is now described. After each user has applied a set of edits to their respective local versions of the translation table 2000 and submitted the resulting edited versions 702a, 702b of system project 702 to be merged with the base system project 702, the merge process can be initiated. In some embodiments the merge process may be initiated manually by one of the users or by another user with administrator privileges.

Figure 21:
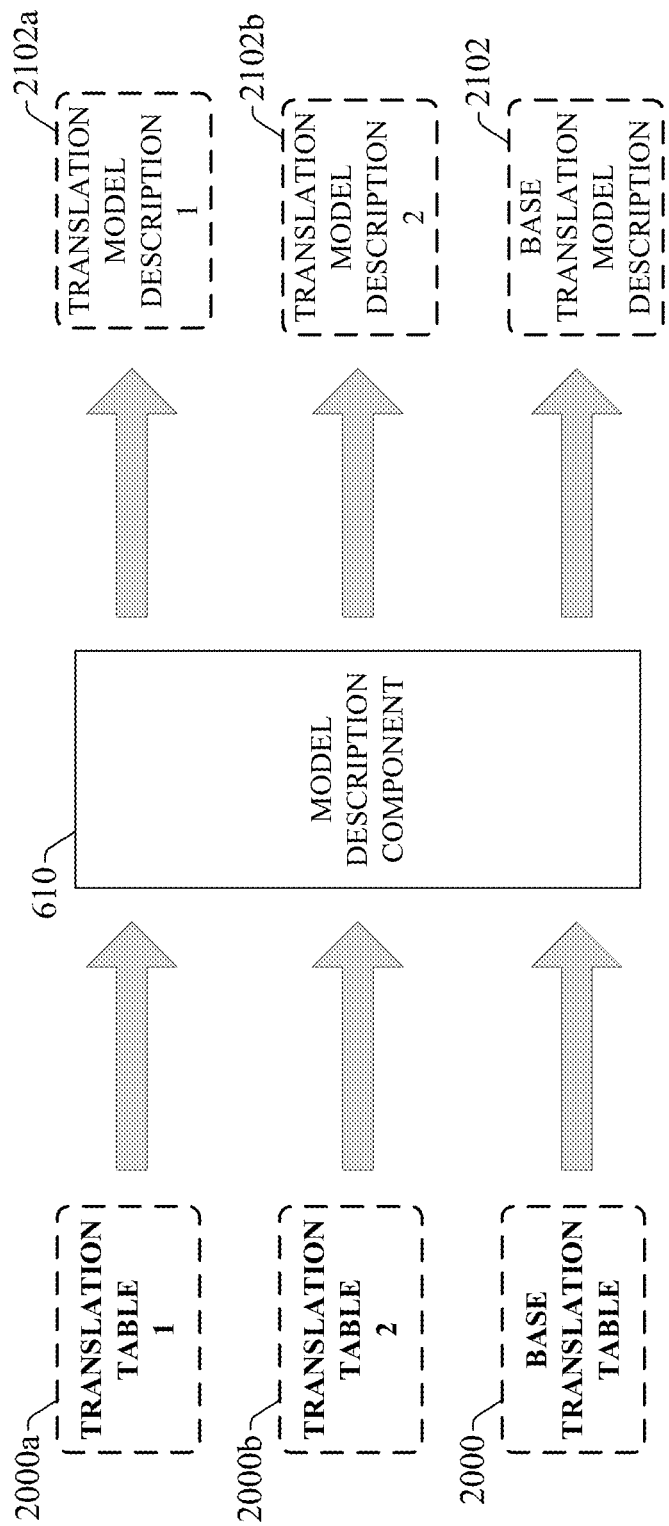
FIG. 21 is a diagram illustrating the conversion of local versions of a translation table and a base translation table into their corresponding model descriptions.

As an initial step of the translation table merge process, the IDE system 602 obtains information model descriptions for each of the locally edited versions of the translation table 2000 as well as for the base translation table 2000 that is included in the base system project 702. FIG. 21 is a diagram illustrating the conversion of the local versions 2000a and 2000b of the translation table 2000 and the base translation table 2000 into their corresponding model descriptions 2102. For simplicity, this example assumes that only two locally edited versions 2000a and 2000b of the translation table 2000 have been submitted to be merged into the base translation table 2000. However, this comparison and merge workflow can be performed on any number of locally edited versions of the translation table 2000 submitted by respective different developers. The local versions 2000a and 2000b of the translation table 2000 may be versions of the translation table 2000 that are associated with the local versions 702a and 702b, respectively, of the system project 702 being edited on client devices 208a and 208b (see FIG. 8). The local versions 2000a and 2000b may be edited separately by different development team members in a variety of languages. When these local versions 702a and 702b of the system project 702 are submitted for integration with the base system project 702, the IDE system 602 can determine whether the location versions 2000a and 2000b of the translation table 2000 were edited locally, and if so, initiate the comparison and merge workflow to integrate the edits into the base translation table 2000.

Figure 22:
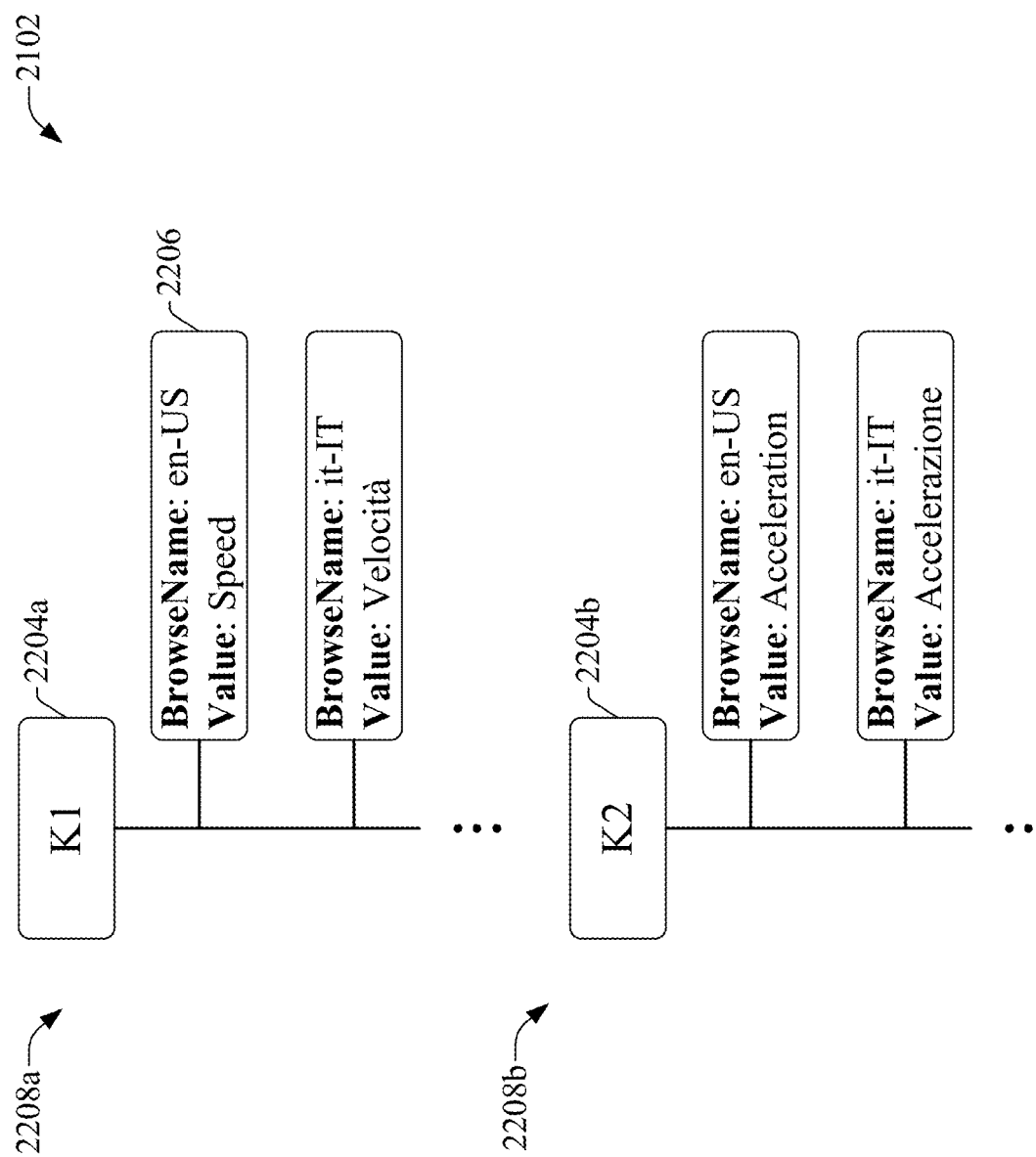
FIG. 22 is a representation of an example model description for a translation table.

In their native format, the translation tables 2000—the base translation table 2000 and the local versions 2000a and 2000b—may be formatted as text-based tables; e.g., with each entry of the table 2000 represented as a comma-separated line of text that defines the translation key and each language-specific version of the word or text string defined by that entry. The model description component 610 can execute a translation table reader algorithm against each local version 2000a and 2000b and against the base translation table 2000. The algorithm translates each version of the translation table 2000 to a corresponding a model description 2102 representing that version of the translation table. FIG. 22 is a representation of an example model description 2102 for a translation table. The model description 2102 of a translation table 2000 represents each translation key of the table 2000 as a root node 2204. For each translation key represented by a root node 2204, the different language-specific versions of the word or text represented by the translation key are represented as child nodes 2206 of the root node 2204. Each child node 2206 represents an entry or cell of the translation table 2000 and defines the column name (BrowseName) of the column in which the entry resides (representing the language of the entry) and the language-specific version of the word or text (Value) contained in that entry or cell. The example model description 2102 depicted in FIG. 22 corresponds to the example model table 2000 illustrated in FIG. 20, and as such depicts two root nodes 2204a and 2204b corresponding translation keys K1 and K2, respectively. Since the example translation table 2000 contains only two languages—English and Italian—each of the two root nodes 2204a and 2204b has two child nodes 2206 representing the two language-specific versions of the word or text associated with the translation key. In general, each root node 2204 representing a translation key will have a number of child nodes 2206 equal to the number of different languages represented by the translation table 2000. In the case of example translation table 2000 illustrated in FIG. 20, this results in a model description 2102 comprising two trees 2208a and 2208b representing the content of each of the translation keys (that is, each row of the translation table 2000) in terms of root and child nodes.

As will be described in more detail below, the model descriptions 2102 will be the basis for comparison between the edited local versions 2000a, 2000b of the translation table and the base translation table 2000. In particular, rather than using simple text for comparison and merging of different versions of a translation table 2000, the IDE system 602 uses the abstract model descriptions 2102 representing the translation table to decompose each user's contribution into single cell operations, which can be easily compared for differences. The IDE system 602 will perform a comparison of the nodes of the model descriptions 2102 to identify which elements of the translation table 2000 have been added, removed, or modified.

Figure 23:
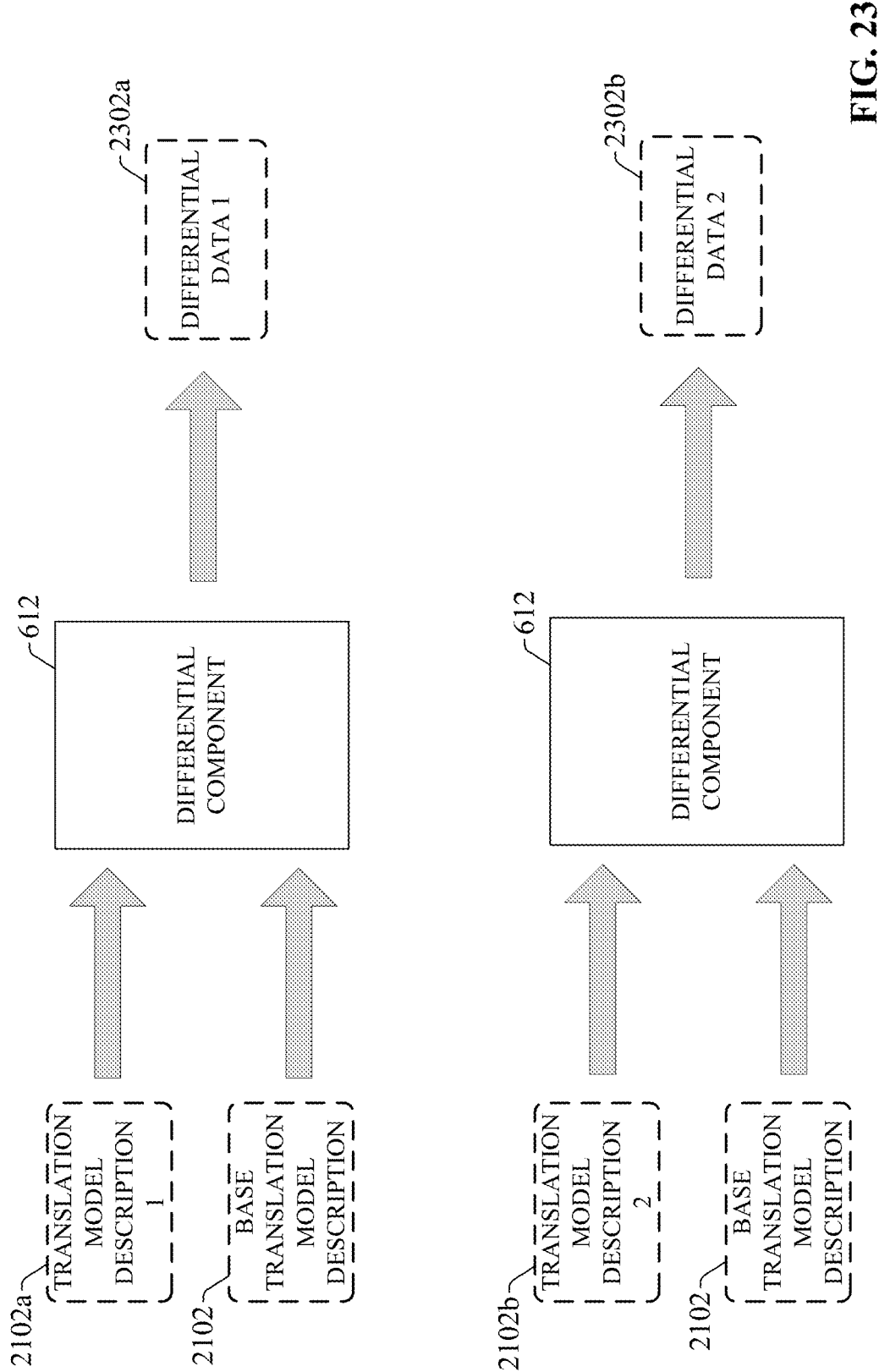
FIG. 23 is a diagram illustrating comparison of the model descriptions to yield differential data.

Once the model descriptions 2102 have been generated, the model descriptions 2102a, 2102b generated for the locally edited translation table versions 2000a, 2000b are each compared to the model description 2102 generated for the base translation table 2000. FIG. 23 is a diagram illustrating comparison of the model descriptions 2102 to yield differential data 2302. The differential component 612 identifies the changes performed on each of the locally edited translation table versions 2000a, 2000b relative to the base translation table 2000 by comparing each model description 2102a, 2102b representing the locally edited versions 2000a, 2000b of the translation tables with the base model description 2102 representing the base translation table 2000. Based on these comparisons, the differential component 612 generates differential data 2302 identifying differences between each locally edited version 2000a, 2000b and the base translation table 2000. In the example depicted in FIG. 23, the comparison between model description 2102a (representing the first locally edited version 2000a of the translation table) and model description 2102 (representing the base translation table 2000) yields differential data 2302a, and the comparison between model description 2102b (representing the second locally edited version 2000b of the translation table) and model description 2102 (representing the base translation table 2000) yields differential data 2302b.

In general, the differential component 612 executes a differential algorithm on each model description 2102a, 2102b representing a locally edited version of the translation table 2000 against the base model description 2102 to generate the differential data 2302a, 2302b for each locally edited version of the translation table. Each set of differential data 2302 is a hierarchical representation of the differences between the two input model descriptions 2102 that produced the differential data 2302; that is, the differences between a locally edited version of the translation table and the base translation table 2000. In some embodiments, each set of differential data 2302 can define a tree structure comprising nodes indicating differential statuses of corresponding nodes of the input model descriptions 2102. To generate the differential data 2302, differential component 612 identifies matching translation key root nodes 2204 between the two input model descriptions 2102 and 2102a/2102b, and compares corresponding child nodes 2206 of the matching translation key root nodes 2204 to determine a differential status for each child node 2206. The resulting differential data 2302 identifies the differential status for each child node 2206. These differential statuses are the same as those discussed above in connection with table 1202, illustrated in FIG. 12 (e.g., Matched, Changed, Removed, or Added) and are determined using a similar node-by-node comparison as that described above for the project model descriptions 902.

For example, if a child node 2206 representing an entry in the translation table 2000 is discovered in both the base translation model description 2102 and the edited model description 2102a, 2102b (assigned to the same translation key root node 2204) and the node 2206 is identical in both versions (both having state A), differential component 612 assigns a Match status for that node (as shown in the first row of table 1202). If the child node 2206 is found in both model descriptions but have different states (state A and state A*, respectively), as shown in the second row of table 1202, differential component 612 assigns a Changed status to the node 2206 to indicate that the corresponding entry of the translation table has been edited in the local version 2000a or 2000b (e.g., to change a spelling of the language-specific word or text string represented by the node 2206). If the node 2206 is found in the base model description 2102 but is not found in the edited model description 2102a, 2102b, as shown in the third row of table 1202, differential component 612 assigns a Removed status to the node 2206 indicating that the corresponding entry of the translation table has been deleted in the local version 2000a or 2000b.

If the node 2206 is found only in the edited model description 2102a, 2102b but has no corresponding node in the base model description 2102, as shown in the fourth row of table 1202, differential component 612 assigns an Added status for that node 2206 to indicate that the corresponding entry of the translation table 2000 has been newly added by the developer. If this newly added node 2206 is found under an existing translation key root node 2204, the newly added child node 2206 may correspond to a new column that was added to the translation table 2000 to add a new language to the table, and may represent a text entry under this new column. If the newly added node 2206 is associated with a new translation key root node 2204 discovered in the edited model description 2102a, 2102b that is not found in the base model description 2102, the new child node 2206 may represent a new word or piece of text added to an existing language (if the BrowseName already exists in the base model description 2102) or may be a new word added for a new language (if the BrowseName does not already exist in the base model description 2102).

Figure 24:
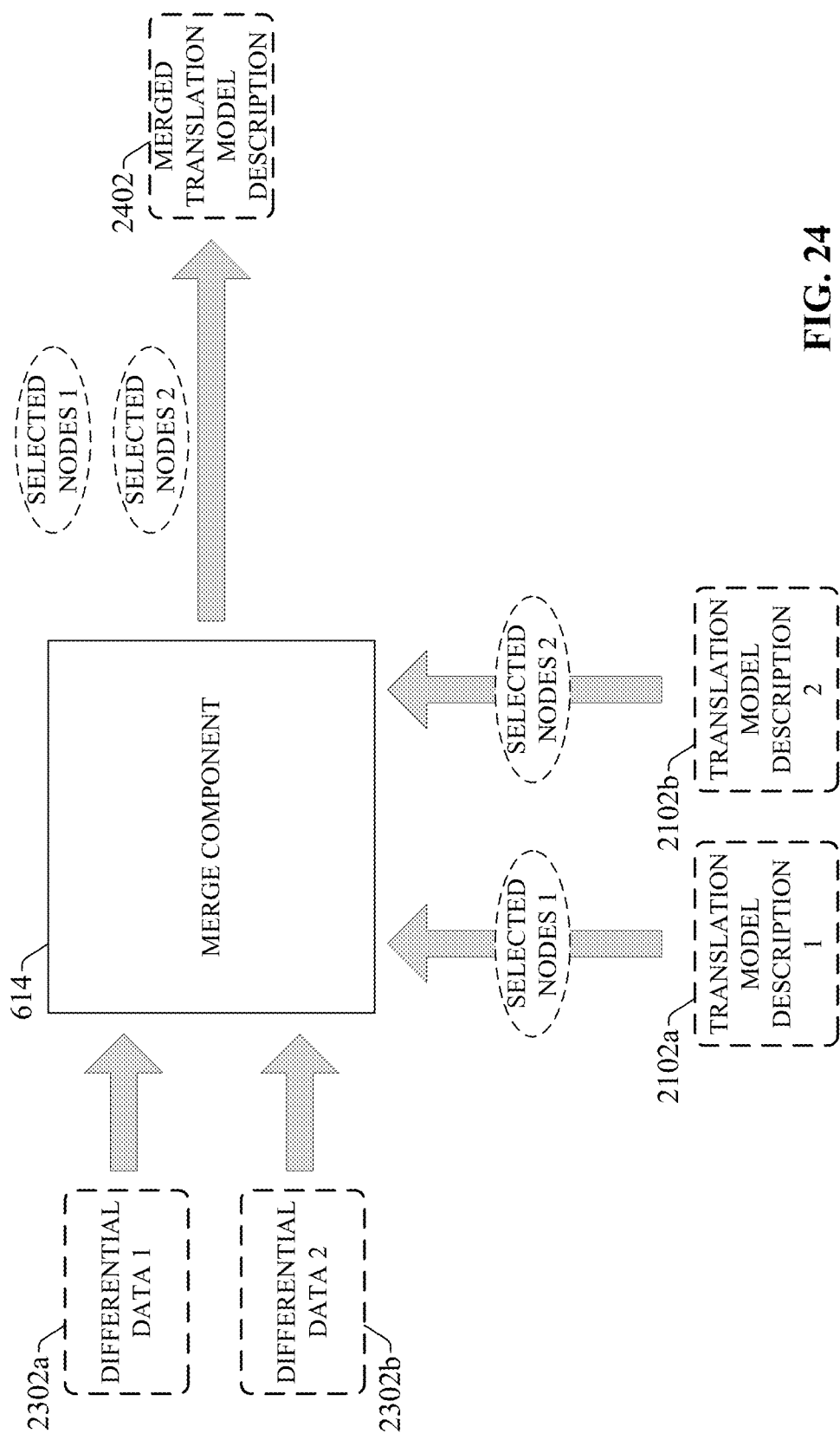
FIG. 24 is a diagram illustrating integration of two sets of edits into a merged model description for a translation table based on analysis of two sets of differential data.

The differential data 2302 for each locally edited version 2000a, 2000b records the differential statuses of each node 2206 in the locally edited version relative to the base translation table 2000. Once the differential component 612 has generated differential data 2302 for each of the locally modified versions 2000a and 2000b of the translation table, the system's merge component 614 generates a merged model description based on analysis of the sets of differential data 2302a, 2302b. FIG. 24 is a diagram illustrating integration of the two sets of edits into a merged model description 2402 for the translation table 2000 based on analysis of the two sets of differential data 2302a and 2302b. The merged model description 2402 is an integration of the two edited model descriptions 2102a and 2102b and represents the hierarchical information model for an updated translation table 2000 that integrates the table edits submitted by the multiple users.

The merge component 614 can create the merged model description 2402 by selecting, for each node 2206 representing a given translation table entry, a version of the node 2206 from one of the two edited model descriptions 2102a or 2102b, or an integration of the two versions of the node 2206. The merge component 614 selects the version of the node 2206 to be included in the merged model description 2402 based on a combined differential status of each node 2206, which itself is based on the individual differential statuses recorded in the differential data 2302a and 2302b for the two edited versions of the translation table.

FIG. 25 is a table 2502 defining example merge actions that can be performed for a given node 2206 based on the combined differential status for the node 2206 as determined from the two sets of differential data 2302a and 2302b. As shown in table 2502, the merge actions that can be performed for a given node 2206 by the merge component 614 are similar to those described above in connection with table 1402 (see FIG. 14). In this example Diff #1 Status is the differential status for a node 2206 of the information model recorded in the first set of differential data 2302a (corresponding to the first locally edited version 2000a of the translation table) and Diff #2 Status is the differential status of the same node 2206 recorded in the second set of differential data 2302b (corresponding to the second locally edited version 2000b of the translation table). The merge component 614 determines a combined differential status for the node 2206 based on the combination of these two differential statuses, and determines a merge action for the node 2206 based on the combined differential status.

In the case of a scenario in which both sets of differential data 2302a and 2302b indicate a node 2206 having an Added status at corresponding locations within the information model hierarchy, the combined status and corresponding merge action for the node 2206 can depend on the contents of the respective versions of the added node 2206. For example, if the BrowseName (the language specified for the node's text content) and the value (the text content itself) contained in the node 2206 are the same in both versions of the added node 2206—indicating that both users have added identical entries to the translation table—the combined status for the node 2206 is set to Added and the new node 2206 is taken from either of the two model descriptions 2102a or 2102b for inclusion in the merged model description 2402. For other combinations of differential statuses (e.g., Match/Match, Changed/Match, etc.), the merge actions performed on the nodes 2206 of the model descriptions 2102a and 2102b based on the differential statuses are similar to those described above in connection with table 1402 (see FIG. 14). This can include prompting the user to manually intervene to resolve conflicts as needed (e.g., for nodes yielding a Conflict combined differential status according to table 2502).

Figure 26:
FIG. 26 is a diagram illustrating translation of a merged model description to a merged translation table.
Figure 27:
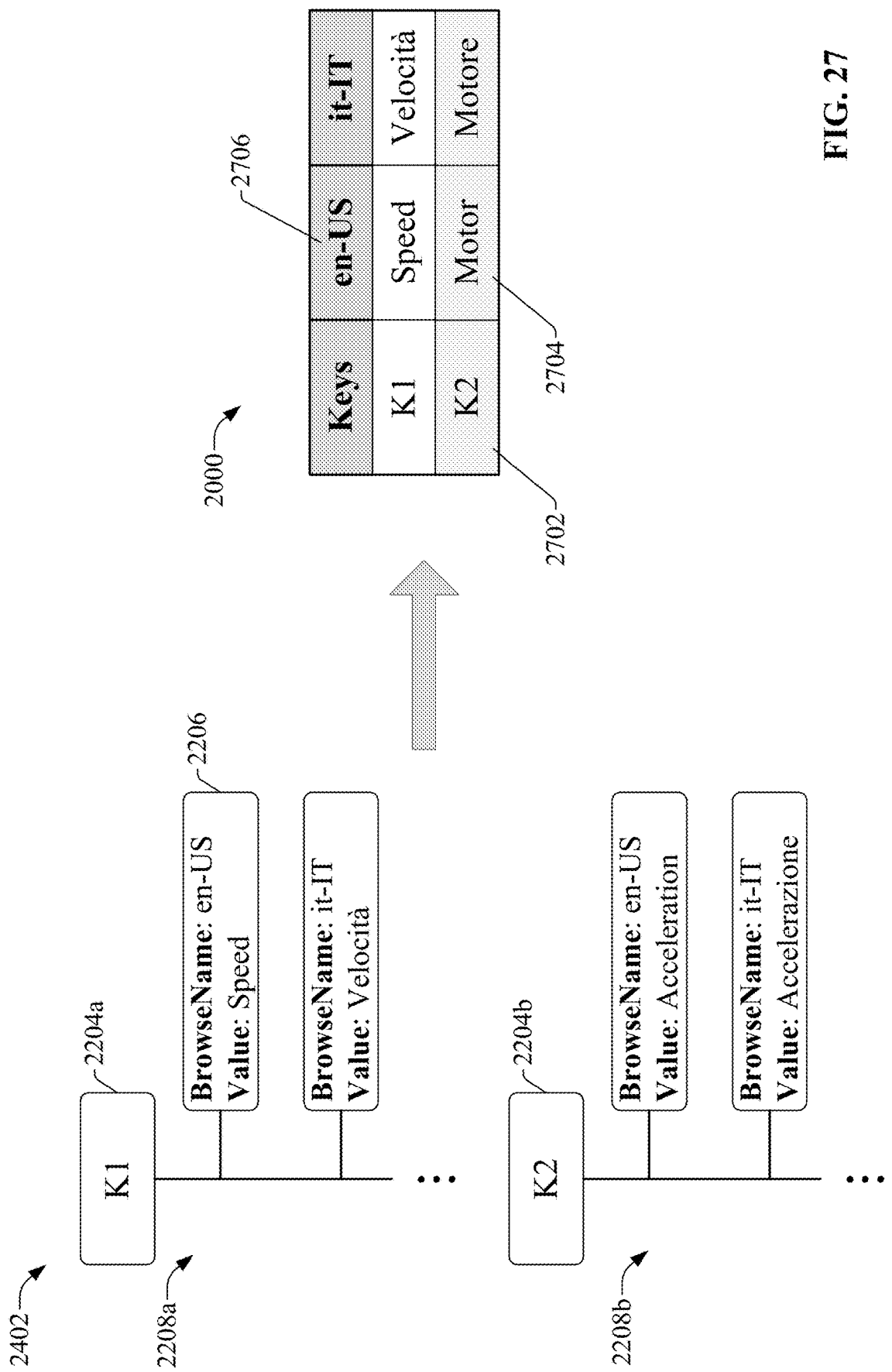
FIG. 27 illustrates an example translation of a merged model description to a new base translation table.

Returning now to FIG. 24, the merge component 614 determines a suitable merge action for each node 2206 in the model descriptions 2102a and 2102b based on the combined differential statuses of the nodes 2206 (e.g., in accordance with the status-based merge actions tabulated in FIG. 25) and generates the merged model description 2402 by applying these merge actions to the nodes 2206. Once the merged model description 2402 has been generated, the project generation component 606 can translate the merged model description 2402 to an updated base translation table 2000 that properly integrates the two sets of collaborative edits, as shown in FIG. 26. The project generation component 606 can apply a translation table writer algorithm that translates each tree 2208 of the merged model description 2402—comprising a root node 2204 representing a translation key and its associated child nodes 2206 representing language-specific representations of a word or piece of text—to a row or entry of the new base translation table 2000. FIG. 27 illustrates an example translation of a merged model description 2402 to a new base translation table 2000. As noted above, each tree 2208 of the model description 2402 represents a row or entry of the translation table 2000, where the row or entry represents different language-specific versions of a given word or text string used in the system project 702. The project generation component 606 translates the root node 2204 of each tree 2208 to the translation key field 2702 for the row, populating the content of the translation key field 2702 with the translation key associated with the root node 2204 (e.g., K1, K2, etc.). The project generation component 606 also translates each child node 2206 associated with the root node 2204 to a data field 2704 within the row and populates the field with the value (the language-specific text content) associated with the child node 2206. The project generation component 606 places the data field 2704 under the column of the table 2000 whose header 2706—specifying the language represented by that column—corresponds to the BrowseName associated with the child node 2206.

This node-level comparison and merge workflow can more accurately and intelligently merge the two sets of edits relative to comparing lines of simple text, since the comparison is performed between corresponding nodes 2206 (representing entries of the translation table 2000) of the two edited versions of the hierarchical information model. This approach takes into consideration the organization of translation information that makes up the translation table 2000, ensuring that corresponding elements of the two edited versions are being compared for the purpose of detecting translation table edits. This approach can also reduce or eliminate instances of false conflicts when merging collaborative edits, since the IDE system 602 does not raise a conflict based merely on discovery of mismatched lines of text. Instead, the IDE system 602 examines and compares corresponding nodes of the model descriptions 2402a and 2402b of the edited translation tables, and as such does not raise conflicts that might otherwise be raised by systems that compare corresponding lines of simple text files.

Figure 28:
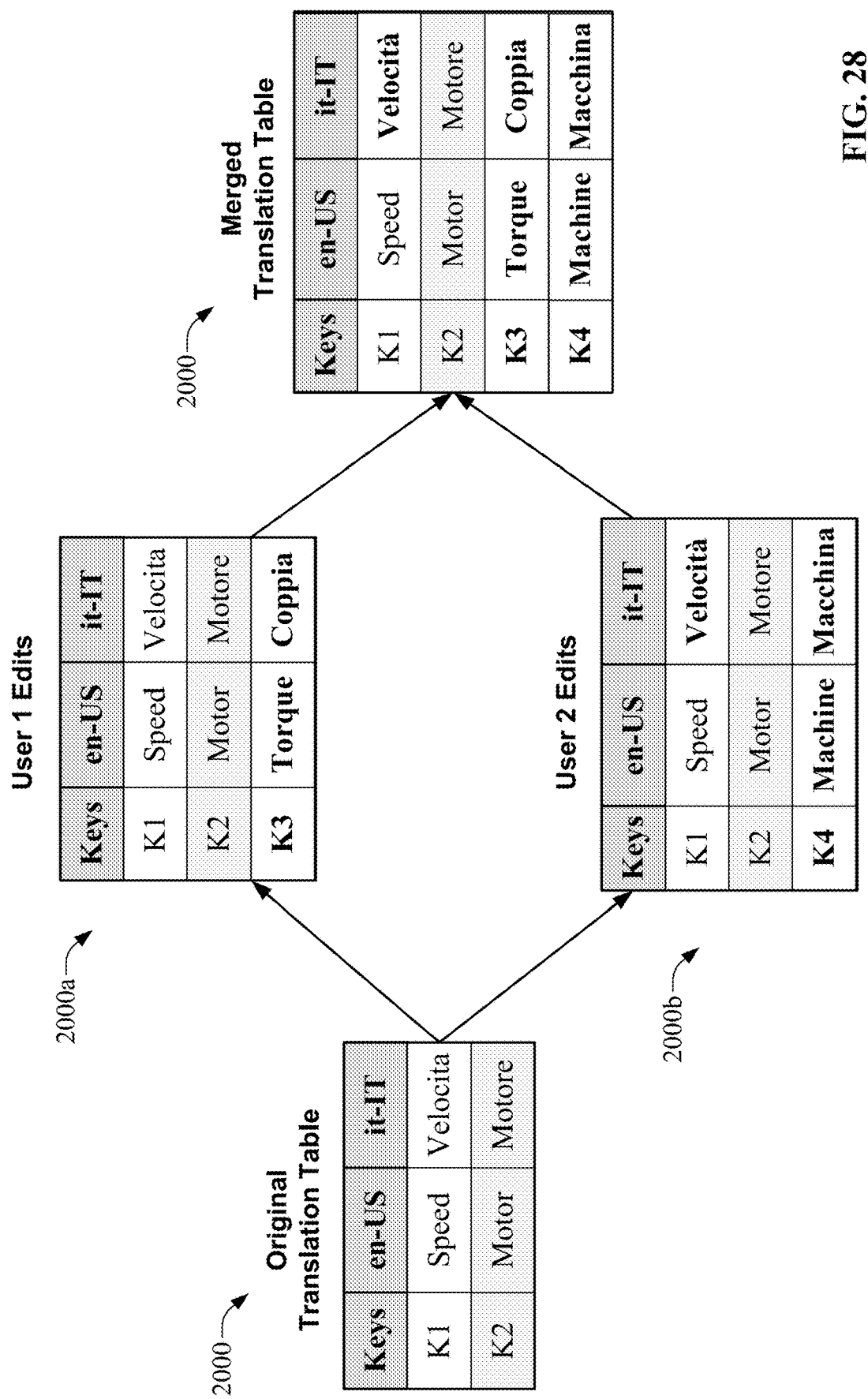
FIG. 28 is a diagram illustrating a collaborative translation table editing scenario.

FIG. 28 is a diagram illustrating a collaborative translation table editing scenario. In this example, the original translation table 2000 (on the left side of FIG. 28) comprises two translation key entries K1 and K2, each defining the English and Italian translations of a word. Translation key K1 defines the translation for the English word "Speed" ("Velocita" in Italian) and translation key K2 defines the translation for the English word "Motor" ("Motore" in Italian). User 1 (e.g., a user of client device 208a in FIG. 8) modifies a local version 2000a of the translation table, which may be an integrated translation table of a local version 702a of system project 702a being edited by User 1, to add a third translation key K3 to the table defining the English and Italian translations of the English word "Torque" ("Coppia" in Italian). Separately, User 2 (e.g., a user of client device 208b in FIG. 8) edits another local version 2000b of the translation table to add a different translation key K4 to the table defining the English and Italian translations of the English word "Machine" (Macchina" in Italian). User 2 also edits the existing K1 entry to change the Italian word "Velocita" to "Velocitá" (adding a grave accent to the letter "a") in data cell (K1, it-IT) of the local version 2000b. These additions and edits are depicted in bold in the edited translation tables 2000a and 2000b.

When these edited versions 2000a and 2000b are converted to model descriptions 2102a and 2102b and compared with the model description 2102 for the base translation table 2000, as described above in connection with FIG. 22-25, the differential component 612 will discover that each edited model description 2102a, 2102b has added a new translation key root node 2204 and associated child nodes 2206 (representing a new word to be translated), resulting in a new tree 2208. The differential component 612 also discovers that each of these added trees 2208 is only present in one of the two model descriptions 2102a or 2102b (since the translation keys of the root nodes 2204 and the values of the child nodes 2206 are different between the two model descriptions 2102a and 2102b). Accordingly, the merge component 614 will add each of these two new trees 2208 to the merged model description 2402. Additionally, the differential component 612 discovers that the value of the child node 2206 corresponding to the (K1, it-IT) has been changed in model description 2102b while remaining unchanged in model description 2102a, and consequently the merge component 614 will take the version of the node 2206 from model description 2102b for inclusion in the merged model description 2402. When the project generation component 606 translates the resulting merged model description 2402 into the new base translation table 2000, the merged table 2000 contains both of the newly added translation keys K3 and K4 (depicted as new rows of the table 2000), and also reflects the edit made to cell (K1, it-IT) by User 2. These updates to the merged translation table 2000 are depicted in bold.

Figure 29A:
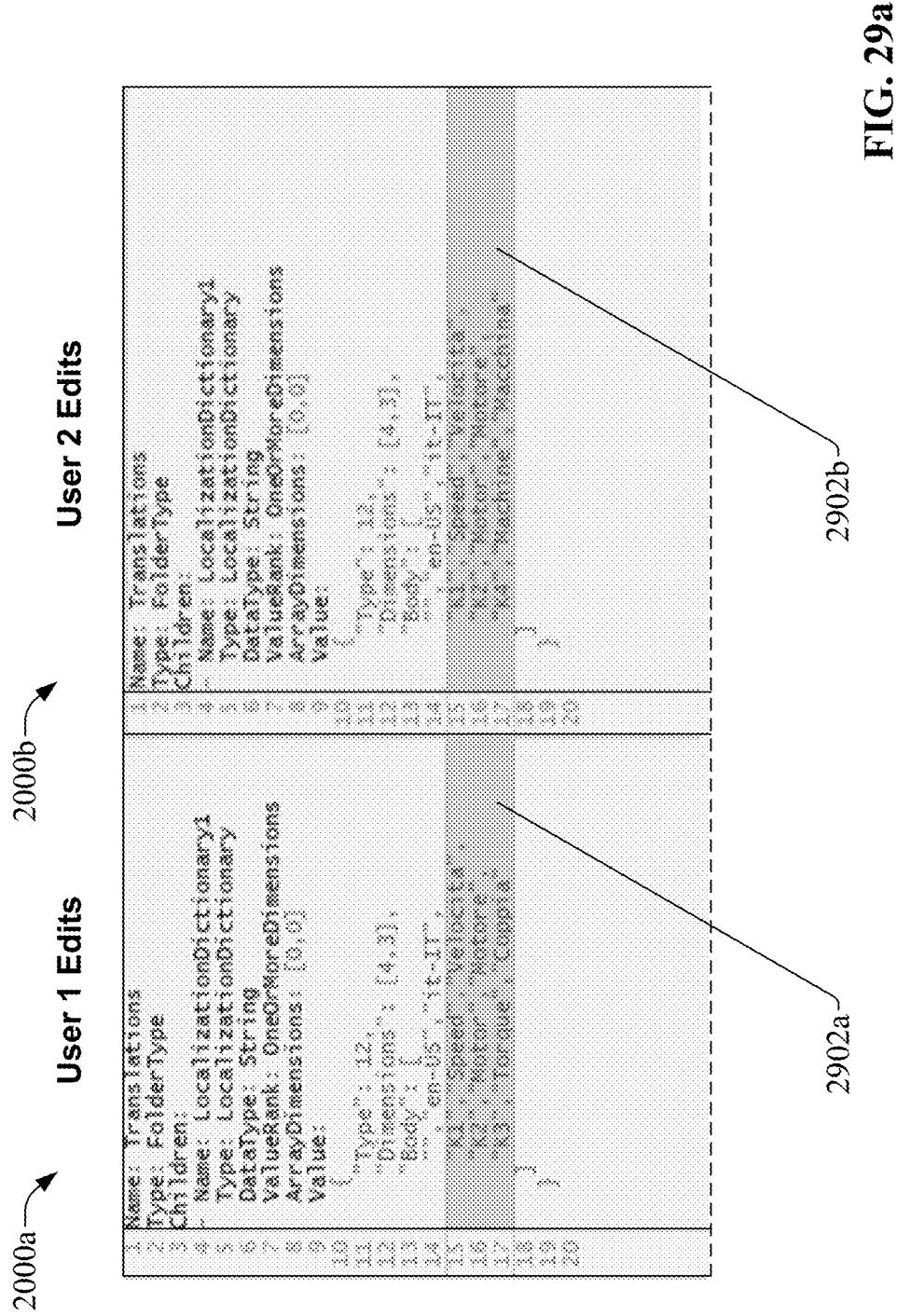
FIG. 29a illustrates text representations of the two edited versions of a translation table, illustrating drawbacks of merging two sets of translation table edits using simple text comparison.

FIG. 29a illustrates text representations of the two edited versions 2000a and 2000b of the translation table, illustrating drawbacks of merging two sets of translation table edits using simple text comparison. In this example, the rows of the translation table are represented as comma-delineated lines of a text file (highlighted by the shaded areas 2902a and 2902b) in which the content of each cell or data field is contained in quotes and separated by commas. As noted above (see FIG. 28), each user has added a new translation key to their respect versions 2000a and 2000b—K3 in version 2000a and K4 in version 2000b. Each of these additions are added as a third line of their respective text representations, below the line for the K2 translation key. Consequently, if the two edited versions 2000a and 2000b are compared using simple text comparison, it is found that both users have changed the same line of the text file, resulting in a conflict that must be manually resolved by a user before the two versions can be merged. FIG. 29b is a text representation of the merged translation table 2000 resulting in the integration of the two edited versions 2000a and 2000b using simple text comparison. As seen in the shaded area 2902c, since the same line of each edited version 2000a and 2000b has been edited in two different ways, both versions 2000a and 2000b are represented in the merged file—resulting in duplicates of the K1 and K2 translation keys as improper artifacts—requiring a user to manually intervene to integrate the edits properly. The necessity to manually integrate the two edits can result in merging errors, including loss of work performed by one of the users, undesired changes to the based translation table 2000, invalid text, improper indentation, or other such issues.

By contrast, the node-based comparison and merge approach carried out by embodiments of the IDE system 602 operate on node-based model descriptions instead of text files. This approach detects no conflicts, and therefore can automatically integrate both users' edits without the need for manual intervention. This is because, rather than comparing corresponding lines of edited text within the simple text representations, the IDE system 602 detects each added or edited cell of the translation table as a node 2206 of its corresponding model description 2102a or 2102b, and detects edits or additions by comparing corresponding nodes 2206 rather than lines of text.

Figure 30:
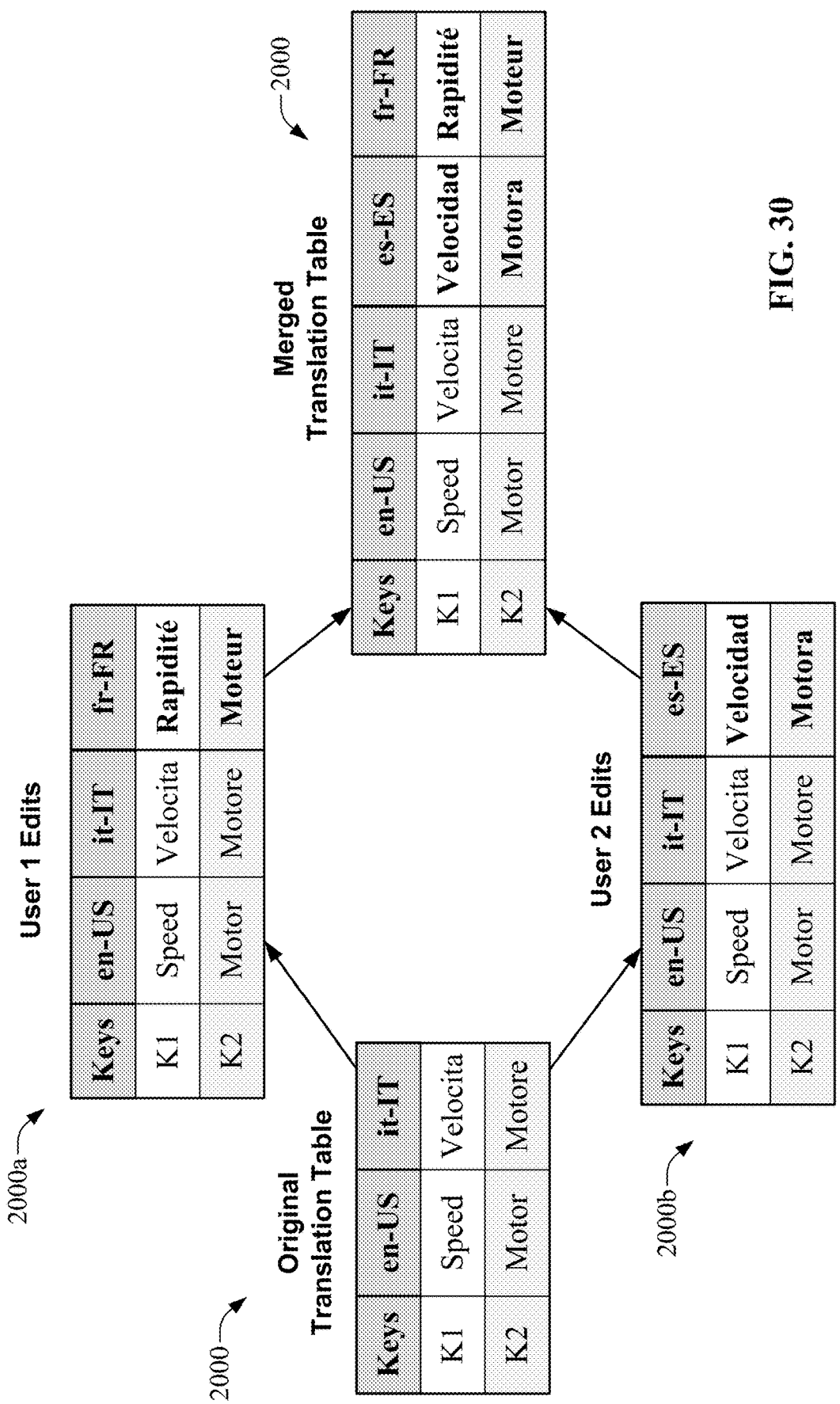
FIG. 30 is a diagram illustrating another collaborative translation table editing scenario.

FIG. 30 is a diagram illustrating another collaborative translation table editing scenario. Similar to the example depicted in FIG. 28, the original translation table 2000—the most recent common ancestor of the two local versions being edited—comprises two translation key entries K1 and K2, each defining the English and Italian translations of a word. User 1 has edited a first local version 2000a of the translation table to add a new column for French language translations (fr-FR). Separately, User 2 has edited the table to add a new column for Spanish language translations (es-ES). These edits are depicted in bold. When these edited versions 2000a and 2000b are converted to model descriptions 2102a and 2102b and compared with the model description 2102 for the base translation table 2000, as described above in connection with FIG. 22-25, the differential component 612 will discover that each edited model description 2102a, 2102b has added a new child node 2206 to each of its translation key root nodes 2204, and that these added child nodes 2206 are only present in one of the two model descriptions 2102a or 2102b (since the browse names of the new child nodes 2206 are different from one another). Accordingly, the merge component 614 will add each of these two new child nodes 2206 to the merged model description 2402, which yields the merged model table 2000 shown in FIG. 30 when converted by the project generation component 606.

Figure 31A:
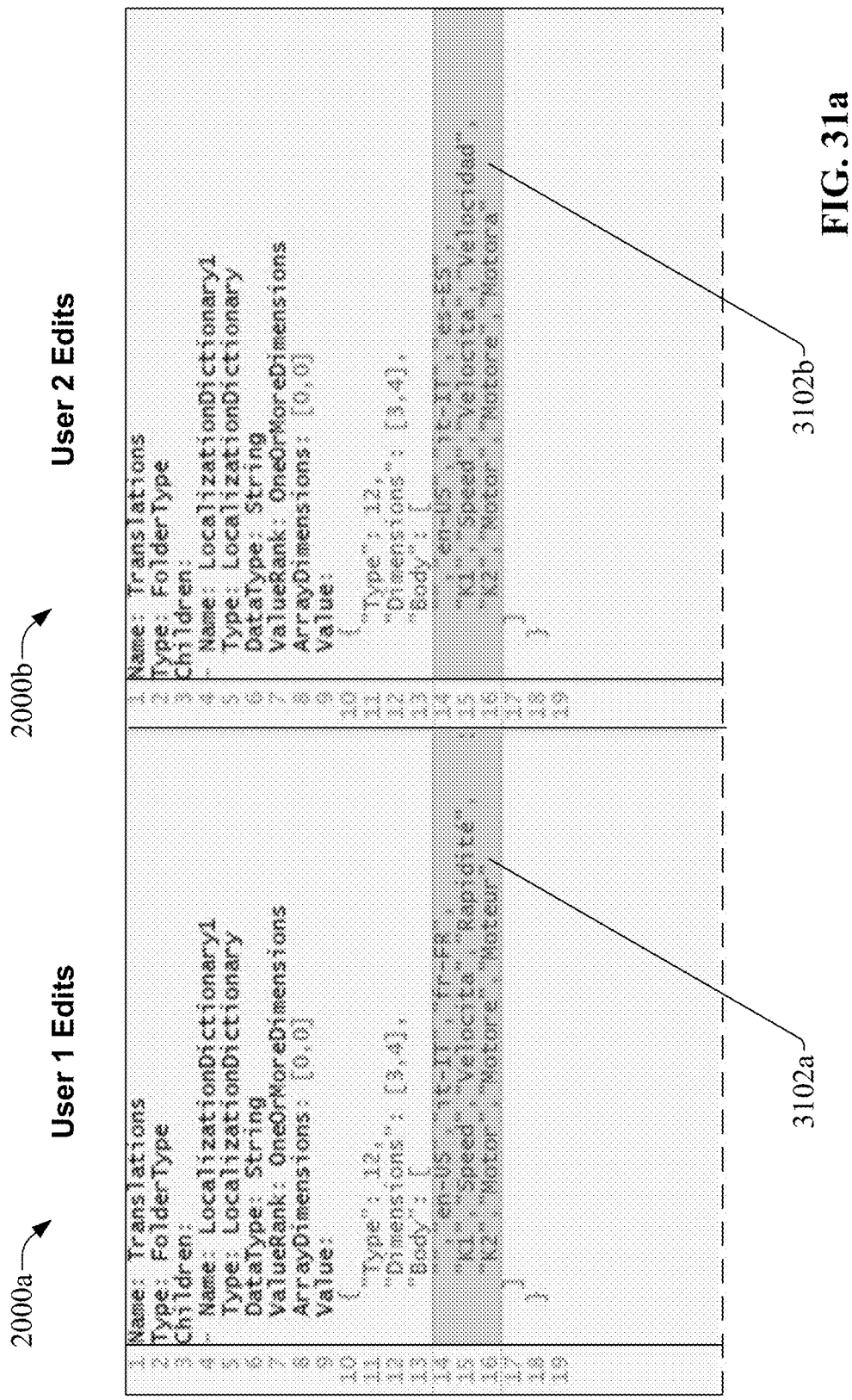
FIG. 31a illustrates text representations of two edited versions of a translation table in a scenario in which two sets of translation table edits are merged using simple text comparison.

For comparison, FIG. 31a illustrates text representations of the two edited versions 2000a and 2000b of the translation table for the scenario described above in connection with FIG. 30, illustrating merging of two sets of translation table edits using simple text comparison. As in the example depicted in FIG. 29a, the rows of the translation table are represented as comma-delineated lines of a text file (highlighted by the shaded areas 3102a and 3102b). Per the scenario described in connection with FIG. 30, each user has added a new column header in the first line of their respect versions 2000a and 2000b—"fr-FR" in version 2000a and "es-ES" in version 2000b. The users have also added a third translated word (corresponding to the newly added column) to each of the translation keys K1 and K2 in the second and third lines of the translation table. If simple text comparison is used to integrate the edits made to the two versions 2000a and 2000b, it is found that both users have changed the same three lines of the text file in different ways, yielding a conflict that must be resolved manually by a user. FIG. 31b is a text representation of the merged translation table 2000 resulting in the integration of the two edited versions 2000a and 2000b using simple text comparison. As seen in the shaded area 3102c, since the same lines of each edited version 2000a and 2000b has been edited in two different ways, both versions 2000a and 2000b are represented in the merged file—resulting in two versions of the K1 and K2 translation keys with different third columns—requiring a user to manually intervene to integrate the edits properly.

By contrast, since the node-based comparison and merge approach carried out by embodiments of the IDE system 602 operate on node-based model descriptions instead of text files, no conflicts are detected by the node-by-node comparison of the two versions 2000a and 2000b. Both users' edits are therefore integrated without the need for manual intervention.

Figure 32A:
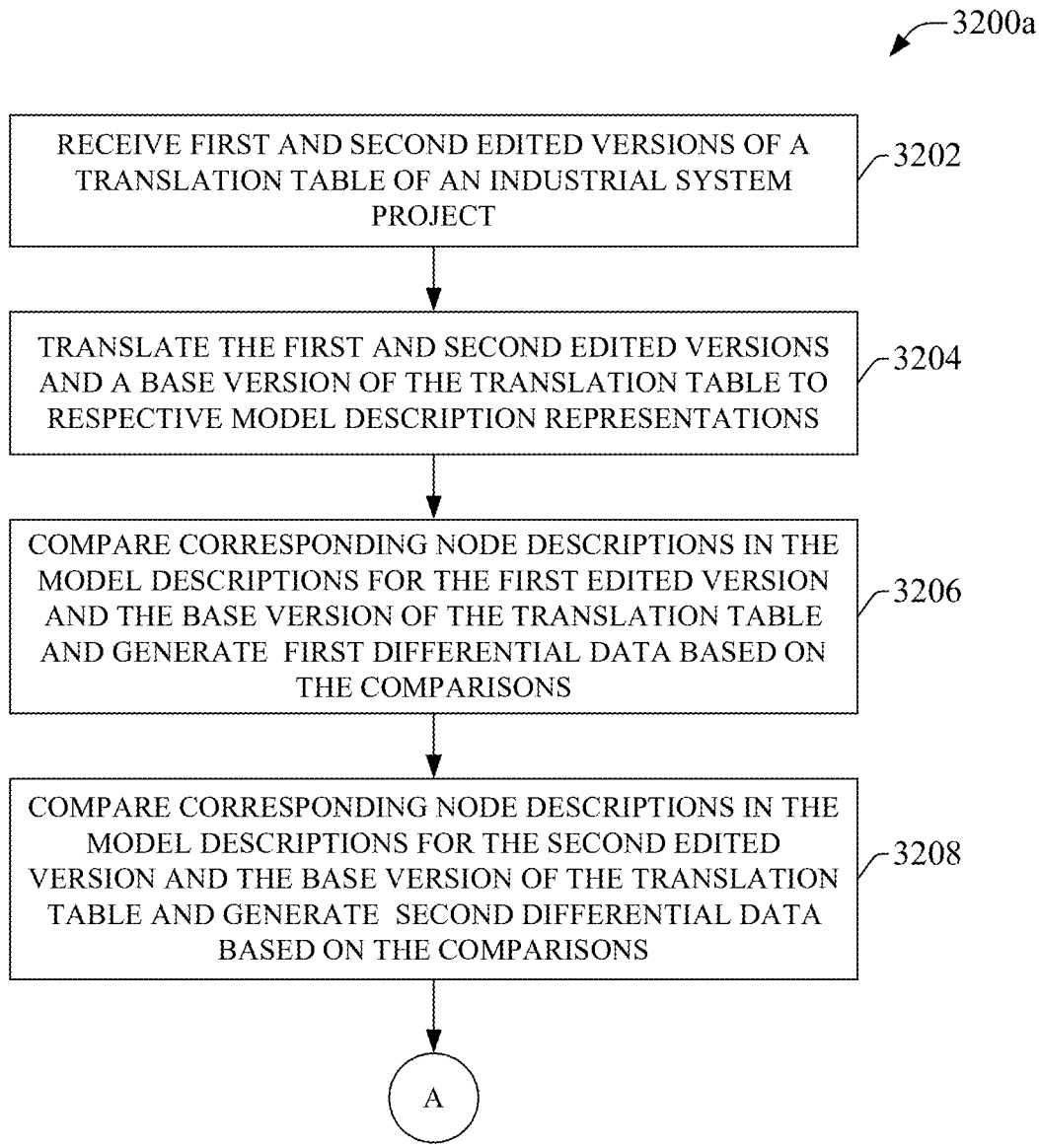
FIG. 32a is a flowchart of a first part of an example methodology for merging collaborative edits to a translation table of an industrial system project.
Figure 32B:
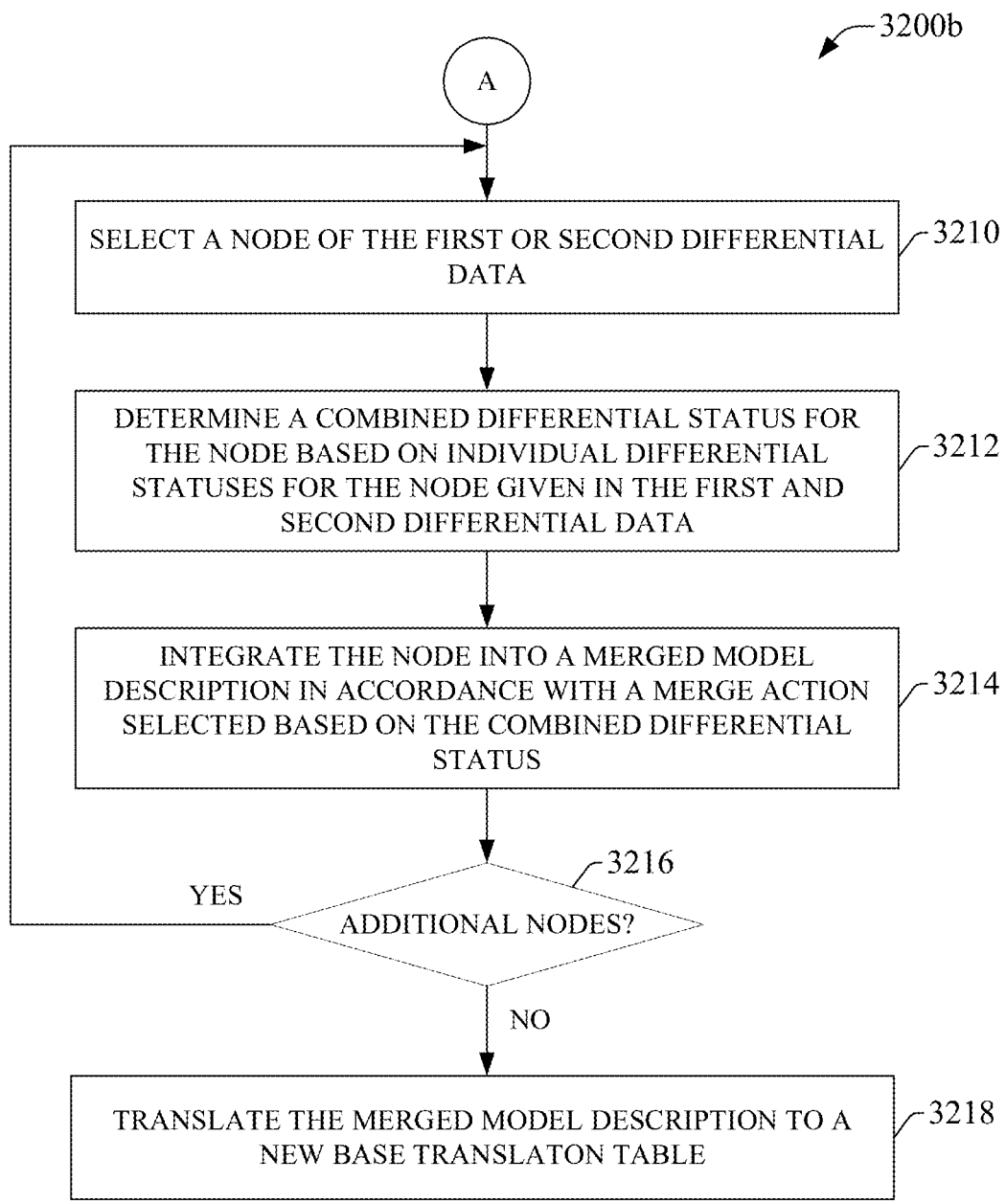
FIG. 32b is a flowchart of a second part of the example methodology for merging collaborative edits to a translation table of an industrial system project

FIGS. 32a-32b illustrates a methodology in accordance with one or more embodiments of the subject application. While, for purposes of simplicity of explanation, the methodology shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 32a illustrates a first part of an example methodology 3200a for merging collaborative edits to a translation table of an industrial system project. The translation table can be an integrated table, file, or text segment that defines translations of different words used in the project into different languages. The system project can be, for example, an industrial controller program and configuration project (e.g., a ladder logic program file), an HMI application, a device configuration file, or another type of industrial system project. The translation table can be referenced by the project when a user selects a preferred language in which to view the project, such that instances of the words throughout the project are rendered in the selected language as defined by the table. Initially, at 3202, first and second edited versions of the translation table are received (e.g., at an industrial IDE system that manages the collaborative editing environment). At 3204, the first and second edited versions, as well as the base version of the translation table (that is, the most recent common ancestor of the first and second edited versions), are translated to respective model descriptions. These model descriptions can represent their respective versions of the translation table as a hierarchical organization of nodes representing respective translation keys (row headers of the table that identify each word-specific entry of the table), and language-specific text contained in the cells or entries of the table.

At 3206, corresponding node descriptions defined in the model descriptions for the first edited version and the base version of the translation table are compared, and results of these node comparisons are recorded as first differential data. For each node, the first differential data defines a differential status—e.g., Matched, Changed, Added, or Removed—for the node in the first edited version relative to the corresponding node in the base translation table.

At 3208, corresponding node descriptions defined in the model descriptions for the second edited version and the base version of the translation table are compared, and results of these node comparisons are recorded as second differential data. This comparison is similar to that of step 3206.

The methodology then proceeds to the second part 3200*b* illustrated in FIG. 32*b*. At 3210, a node defined in the first or second differential data is selected. At 3212, a combined differential status for the selected node is determined based on the individual differential statuses of the node reported in the first and second sets of differential data, respectively (e.g., as determined based on table 2502 of FIG. 25). At 3214, the node is integrated into a merged model description in accordance with a merge action selected based on the combined differential status determined at step 3212. Example merge actions can include, for example, selecting the node description from the model description of either the first or second version of the translation table for inclusion in the merged model description, selecting the node descriptions from the model descriptions of both of the first and second versions of the translation table, omitting the node from the merged model description, or other merge actions (see, e.g., the example merge actions depicted in table 2502 of FIG. 25).

At 3216, a determination is made as to whether there are additional nodes recorded in the first or second differential data that have not yet been examined. If there are additional nodes to be examined (YES at step 3216), the methodology returns to step 3210, where another node is selected and steps 3212 and 3214 are repeated for the next node. When all nodes have been examined and a merge action has been performed for all nodes (NO at step 3216), the methodology proceeds to step 3218, where the merged model description is translated to a new base translation table, which integrates the two sets of submitted edits.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 33:
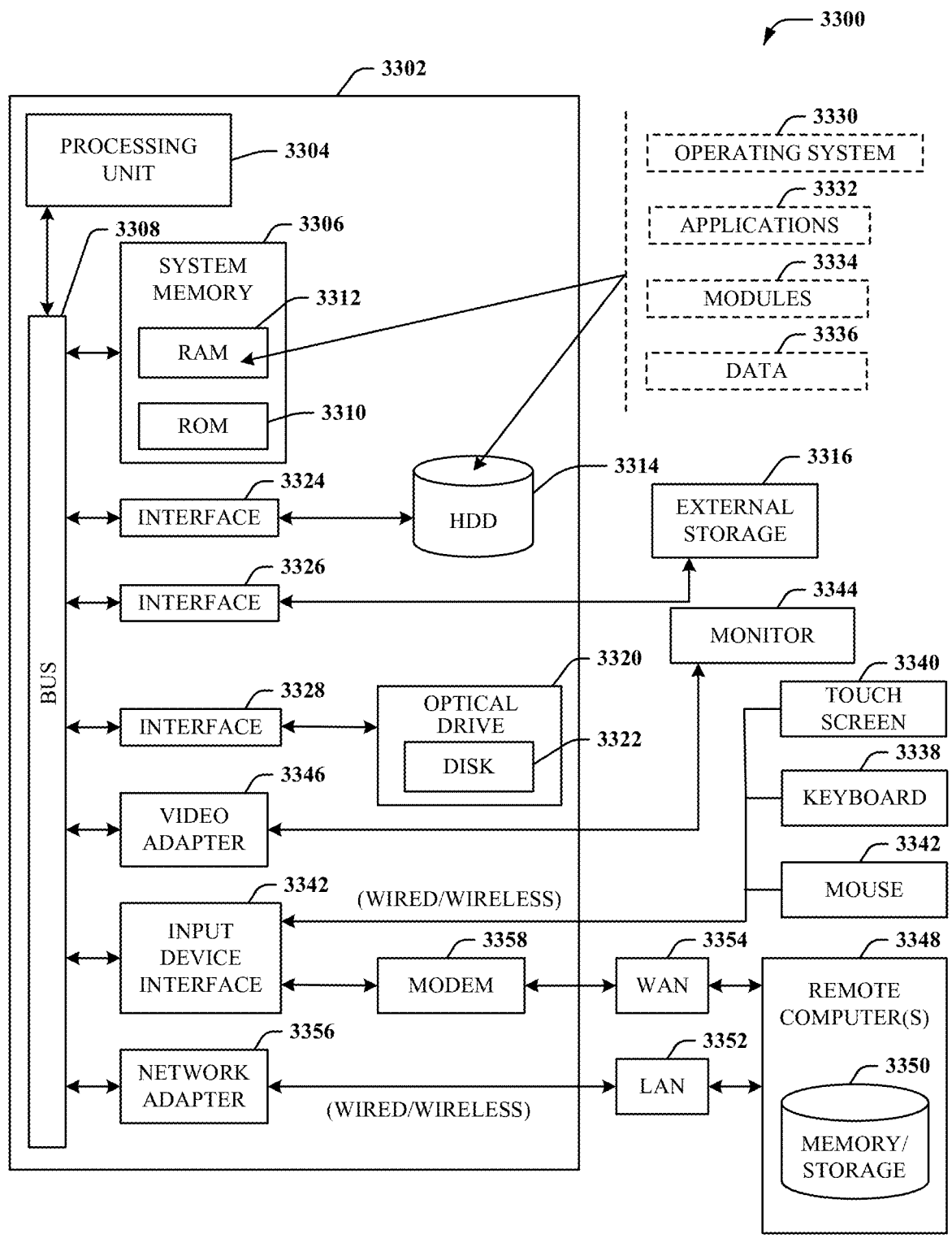
FIG. 33 is an example computing environment.
Figure 34:
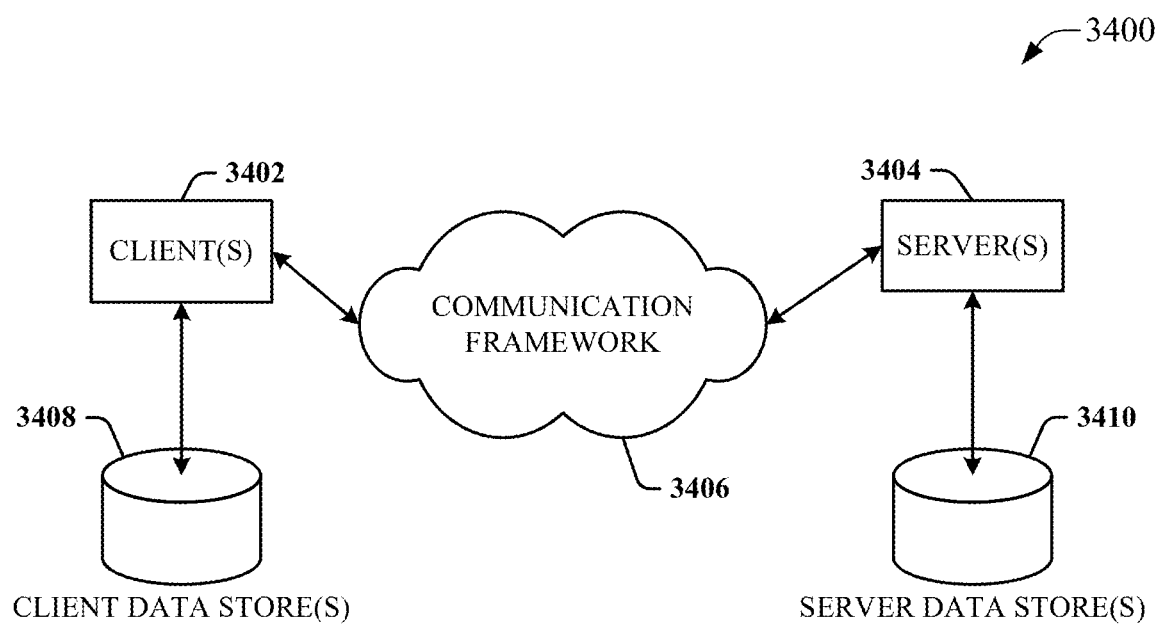
FIG. 34 is an example networking environment.

In order to provide a context for the various aspects of the disclosed subject matter, FIGS. 33 and 34 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 33 the example environment 3300 for implementing various embodiments of the aspects described herein includes a computer 3302, the computer 3302 including a processing unit 3304, a system memory 3306 and a system bus 3308. The system bus 3308 couples system components including, but not limited to, the system memory 3306 to the processing unit 3304. The processing unit 3304 can be any of various commercially available processors. Dual microprocessors and other multi-processor architectures can also be employed as the processing unit 3304.

The system bus 3308 can be any of several types of bus structure that can further interconnect to a memory bus (with or without a memory controller), a peripheral bus, and a local bus using any of a variety of commercially available bus architectures. The system memory 3306 includes ROM 3310 and RAM 3312. A basic input/output system (BIOS) can be stored in a non-volatile memory such as ROM, erasable programmable read only memory (EPROM), EEPROM, which BIOS contains the basic routines that help to transfer information between elements within the computer 3302, such as during startup. The RAM 3312 can also include a high-speed RAM such as static RAM for caching data.

The computer 3302 further includes an internal hard disk drive (HDD) 3314 (e.g., EIDE, SATA), one or more external storage devices 3316 (e.g., a magnetic floppy disk drive (FDD) 3316, a memory stick or flash drive reader, a memory card reader, etc.) and an optical disk drive 3320 (e.g., which can read or write from a CD-ROM disc, a DVD, a BD, etc.). While the internal HDD 3314 is illustrated as located within the computer 3302, the internal HDD 3314 can also be configured for external use in a suitable chassis (not shown). Additionally, while not shown in environment 3300, a solid state drive (SSD) could be used in addition to, or in place of, an HDD 3314. The HDD 3314, external storage device(s) 3316 and optical disk drive 3320 can be connected to the system bus 3308 by an HDD interface 3324, an external storage interface 3326 and an optical drive interface 3328, respectively. The interface 3324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 3302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 3312, including an operating system 3330, one or more application programs 3332, other program modules 3334 and program data 3336. All or portions of the operating system, applications, modules, and/or data can also be cached in the RAM 3312. The systems and methods described herein can be implemented utilizing various commercially available operating systems or combinations of operating systems.

Computer 3302 can optionally comprise emulation technologies. For example, a hypervisor (not shown) or other intermediary can emulate a hardware environment for operating system 3330, and the emulated hardware can optionally be different from the hardware illustrated in FIG. 33. In such an embodiment, operating system 3330 can comprise one virtual machine (VM) of multiple VMs hosted at computer 3302. Furthermore, operating system 3330 can provide runtime environments, such as the Java runtime environment or the .NET framework, for application programs 3332. Runtime environments are consistent execution environments that allow application programs 3332 to run on any operating system that includes the runtime environment. Similarly, operating system 3330 can support containers, and application programs 3332 can be in the form of containers, which are lightweight, standalone, executable packages of software that include, e.g., code, runtime, system tools, system libraries and settings for an application.

Further, computer 3302 can be enable with a security module, such as a trusted processing module (TPM). For instance with a TPM, boot components hash next in time boot components, and wait for a match of results to secured values, before loading a next boot component. This process can take place at any layer in the code execution stack of computer 3302, e.g., applied at the application execution level or at the operating system (OS) kernel level, thereby enabling security at any level of code execution.

A user can enter commands and information into the computer 3302 through one or more wired/wireless input devices, e.g., a keyboard 3338, a touch screen 3340, and a pointing device, such as a mouse 3324. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 3304 through an input device interface 3344 that can be coupled to the system bus 3308, but can be connected by other interfaces, such as a parallel port, an IEEE 1394 serial port, a game port, a USB port, an IR interface, a BLUETOOTH® interface, etc.

A monitor 3344 or other type of display device can be also connected to the system bus 3308 via an interface, such as a video adapter 3346. In addition to the monitor 3344, a computer typically includes other peripheral output devices (not shown), such as speakers, printers, etc.

The computer 3302 can operate in a networked environment using logical connections via wired and/or wireless communications to one or more remote computers, such as a remote computer(s) 3348. The remote computer(s) 3348 can be a workstation, a server computer, a router, a personal computer, portable computer, microprocessor-based entertainment appliance, a peer device or other common network node, and typically includes many or all of the elements described relative to the computer 3302, although, for purposes of brevity, only a memory/storage device 3350 is illustrated. The logical connections depicted include wired/wireless connectivity to a local area network (LAN) 3352 and/or larger networks, e.g., a wide area network (WAN) 3354. Such LAN and WAN networking environments are commonplace in offices and companies, and facilitate enterprise-wide computer networks, such as intranets, all of which can connect to a global communications network, e.g., the Internet.

When used in a LAN networking environment, the computer 3302 can be connected to the local network 3352 through a wired and/or wireless communication network interface or adapter 3356. The adapter 3356 can facilitate wired or wireless communication to the LAN 3352, which can also include a wireless access point (AP) disposed thereon for communicating with the adapter 3356 in a wireless mode.

When used in a WAN networking environment, the computer 3302 can include a modem 3358 or can be connected to a communications server on the WAN 3354 via other means for establishing communications over the WAN 3354, such as by way of the Internet. The modem 3358, which can be internal or external and a wired or wireless device, can be connected to the system bus 3308 via the input device interface 3324. In a networked environment, program modules depicted relative to the computer 3302 or portions thereof, can be stored in the remote memory/storage device 3350. It will be appreciated that the network connections shown are example and other means of establishing a communications link between the computers can be used.

When used in either a LAN or WAN networking environment, the computer 3302 can access cloud storage systems or other network-based storage systems in addition to, or in place of, external storage devices 3316 as described above. Generally, a connection between the computer 3302 and a cloud storage system can be established over a LAN 3352 or WAN 3354 e.g., by the adapter 3356 or modem 3358, respectively. Upon connecting the computer 3302 to an associated cloud storage system, the external storage interface 3326 can, with the aid of the adapter 3356 and/or modem 3358, manage storage provided by the cloud storage system as it would other types of external storage. For instance, the external storage interface 3326 can be configured to provide access to cloud storage sources as if those sources were physically connected to the computer 3302.

The computer 3302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 34 is a schematic block diagram of a sample computing environment 3400 with which the disclosed subject matter can interact. The sample computing environment 3400 includes one or more client(s) 3402. The client(s) 3402 can be hardware and/or software (e.g., threads, processes, computing devices). The sample computing environment 3400 also includes one or more server(s) 3404. The server(s) 3404 can also be hardware and/or software (e.g., threads, processes, computing devices). The servers 3404 can house threads to perform transformations by employing one or more embodiments as described herein, for example. One possible communication between a client 3402 and servers 3404 can be in the form of a data packet adapted to be transmitted between two or more computer processes. The sample computing environment 3400 includes a communication framework 3406 that can be employed to facilitate communications between the client(s) 3402 and the server(s) 3404. The client(s) 3402 are operably connected to one or more client data store(s) 3408 that can be employed to store information local to the client(s) 3402. Similarly, the server(s) 3404 are operably connected to one or more server data store(s) 3410 that can be employed to store information local to the servers 3404.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
a memory; and
a processor, operatively coupled to the memory that executes executable components stored on the memory, wherein the executable components comprise:
a merge component configured to merge a first edited version of a translation table and a second edited version of the translation table to yield a merged version of the translation table that is referenced by an industrial system project, the translation table being associated with translating different local languages,
wherein
the merge component is configured to switch a language in which the industrial system project is rendered on a client device, the industrial system project being at least one of an industrial controller program, a human-machine interface application, or a device configuration file,
the merge component is configured to generate the merged version of the translation table based on a comparison of nodes defined in a first model description representing the first edited version with corresponding nodes defined in a second model description representing the second edited version,
the first model description and the second model description represent the first edited version and the second edited version as hierarchical organizations of nodes representing content of the first edited version and the second edited version, and
nodes, of the hierarchical organization of nodes, corresponding to an entry of the first edited version of the translation table or the second edited version of the translation table comprise at least
a root node defining a translation key for the entry, and
child nodes associated with the root node defining respective different language-specific versions of a word associated with the translation key.

2. The system of claim 1, the executable components further comprising a differential component configured to
generate first differential data based on a comparison of the first model description with a base model description representing a base version of the translation table, the first differential data specifying differential statuses of respective nodes of the first model description relative to corresponding nodes of the base model description, and
generate second differential data based on a comparison of the second model description with the base model description, the second differential data specifying differential statuses of respective nodes of the second model description relative to corresponding nodes of the base model description.

3. The system of claim 2, wherein the merge component is configured to
determine combined differential statuses for respective nodes of the first model description and the second model description based on the differential statuses of the respective nodes recorded in the first differential data and the second differential data, and
generate a merged model description that integrates edits contained in the first model description and edits contained in the second model description based on the differential statuses.

4. The system of claim 3, wherein the combined differential statuses indicate at least one of a node that matches its corresponding node in the base version of the translation table, a node that has been modified relative to its corresponding node in the base version of the translation table, a node that has been removed, or a node that has been added.

5. The system of claim 3, wherein the merge component is configured to, for a node of the respective nodes, execute a merge action to integrate the node into the merged model description based on the combined differential status of the node.

6. The system of claim 3, wherein the executable components further comprise a project generation component configured to translate the merged model description to the merged version of the translation table.

7. The system of claim 1, wherein the executable components further comprise a model description component configured to translate the first edited version and the second edited version to the first model description and the second model description, respectively.

8. The system of claim 1, wherein the merged version of the translation table comprises rows corresponding to respective pieces of text used in the industrial system project.

9. The system of claim 8, wherein the pieces of text comprise at least one of
a label or description string applied to a programmatic or visual element of the industrial system project or
a tag name used in the industrial system project.

10. A method, comprising:
receiving, by a system comprising a processor, a first edited version of a translation table, the translation table being associated with translating different local languages;
receiving, by the system, a second edited version of the translation table;
comparing, by the system, nodes defined in a first model description of the first edited version with corresponding nodes defined in a second model description representing the second edited version, wherein
the first model description and the second model description represent the first edited version and the second edited version as hierarchical organizations of nodes representing content of the first edited version and the second edited version, and
nodes, of the hierarchical organization of nodes, corresponding to an entry of the first edited version of the translation table or the second edited version of the translation table comprise at least
a root node defining a translation key for the entry, and child nodes associated with the root node defining respective different language-specific versions of a word associated with the translation key;

merging, by the system, the first edited version with the second edited version based on a result of the comparing to yield a merged version of the translation table; and switching, by the system, a language in which an industrial system project is rendered on a client device based on reference to the merged version of the translation table, wherein the industrial system project is at least one of an industrial controller program, a human-machine interface application, or a device configuration file.

11. The method of claim 10, wherein the comparing further comprises:

generating first differential data based on a comparison of the first model description with a base model description representing a base version of the translation table, the first differential data specifying differential statuses of respective nodes of the first model description relative to corresponding nodes of the base model description, and generating second differential data based on a comparison of the second model description with the base model description, the second differential data specifying differential statuses of respective nodes of the second model description relative to corresponding nodes of the base model description.

12. The method of claim 11, wherein the merging comprises:

determining combined differential statuses for respective nodes of the first model description and the second model description based on the differential statuses of the respective nodes recorded in the first differential data and the second differential data, and generating a merged model description that integrates edits contained in the first model description and edits contained in the second model description based on the differential statuses.

13. The method of claim 12, wherein the combined differential statuses indicate at least one of a node that matches its corresponding node in the base version of the translation table, a node that has been modified relative to its corresponding node in the base version of the translation table, a node that has been removed, or a node that has been added.

14. The method of claim 12, wherein the generating of the merged model description comprises, for a node of the respective nodes, executing a merge action to integrate the node into the merged model description based on the combined differential status of the node.

15. The method of claim 10, wherein the merged version of the translation table comprises rows corresponding to respective pieces of text used in the industrial system project.

16. A non-transitory computer-readable medium having stored thereon instructions that, in response to execution, cause a system comprising a processor to perform operations, the operations comprising:

receiving a first edited version of a translation table, the translation table being associated with translating different local languages;

receiving a second edited version of the translation table;

translating the first edited version and the second edited version to a first model description and a second model description, respectively, wherein the first model description and the second model description represent the first edited version and the second edited version as respective hierarchical organizations of nodes representing content of the first edited version and the second edited version, and the nodes comprise, for an entry of the first edited version of the translation table or the second edited version of the translation table, a root node defining a translation key for the entry, and child nodes associated with the root node defining respective different language-specific versions of a word associated with the translation key;

comparing nodes defined in a first model description of the first edited version with corresponding nodes defined in a second model description representing the second edited version;

merging the first edited version with the second edited version based on a result of the comparing to yield a merged version of the translation table; and switching a language in which an industrial system project is rendered on a client device based on reference to the merged version of the translation table, wherein the industrial system project is at least one of an industrial controller program, a human-machine interface application, or a device configuration file.

17. The non-transitory computer-readable medium of claim 16, wherein the comparing further comprises:

generating first differential data based on a comparison of the first model description with a base model description representing a base version of the translation table, the first differential data specifying differential statuses of respective nodes of the first model description relative to corresponding nodes of the base model description, and generating second differential data based on a comparison of the second model description with the base model description, the second differential data specifying differential statuses of respective nodes of the second model description relative to corresponding nodes of the base model description.

18. The non-transitory computer-readable medium of claim 17, wherein the merging comprises:

determining combined differential statuses for respective nodes of the first model description and the second model description based on the differential statuses of the respective nodes recorded in the first differential data and the second differential data, and generating a merged model description that integrates edits contained in the first model description and edits contained in the second model description based on the differential statuses.

19. The non-transitory computer-readable medium of claim 18, wherein the combined differential statuses indicate at least one of a node that matches its corresponding node in the base version of the translation table, a node that has been modified relative to its corresponding node in the base version of the translation table, a node that has been removed, or a node that has been added.

20. The non-transitory computer-readable medium of claim 18, wherein the generating of the merged model description comprises, for a node of the respective nodes, executing a merge action to integrate the node into the merged model description based on the combined differential status of the node.

* * * * *